(12) United States Patent
Okada

(10) Patent No.: US 6,894,482 B2
(45) Date of Patent: *May 17, 2005

(54) APPARATUS FOR DETECTING A PHYSICAL QUANTITY ACTING AS AN EXTERNAL FORCE AND METHOD FOR TESTING AND MANUFACTURING THIS APPARATUS

(76) Inventor: Kazuhiro Okada, 73, Sugaya 4-Chome, Ageo-Shi, Saitama 362 (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/816,548

(22) Filed: Apr. 1, 2004

(65) Prior Publication Data

US 2004/0189340 A1 Sep. 30, 2004

Related U.S. Application Data

(62) Division of application No. 10/298,275, filed on Nov. 15, 2002, which is a division of application No. 09/716,773, filed on Nov. 20, 2000, now Pat. No. 6,512,364, which is a division of application No. 09/019,978, filed on Feb. 6, 1998, now Pat. No. 6,185,814, which is a division of application No. 08/641,078, filed on Apr. 26, 1996, now Pat. No. 5,744,718, which is a division of application No. 08/393,801, filed on Feb. 24, 1995, now Pat. No. 5,531,092, which is a division of application No. 08/168,024, filed on Dec. 15, 1993, now Pat. No. 6,474,133, which is a division of application No. 07/761,771, filed as application No. PCT/JP90/01688 on Dec. 26, 1990, now Pat. No. 5,295,386.

(30) Foreign Application Priority Data

Dec. 28, 1989 (JP) .............................................. 1-343354
Mar. 27, 1990 (JP) ................................................ 2-77397
Jul. 27, 1990 (JP) .............................................. 2-200449

(51) Int. Cl.$^7$ ............................................. G01P 15/12
(52) U.S. Cl. ......................... 324/158.1; 73/1 D; 73/1.37
(58) Field of Search ........................... 324/158.1, 117 R, 324/117 H, 73.1, 765, 754; 73/1 D, 1.37, 517 R, 517 B, 1 C, 1 B, 4 R, 862.063, 862.68, 862.93, 517 D

(56) References Cited

U.S. PATENT DOCUMENTS 3,120,622 A  2/1964 Dranetz et al.

(Continued)

FOREIGN PATENT DOCUMENTS

DE  3742385  6/1989

(Continued)

OTHER PUBLICATIONS

Allen, H.V., et al. "Accelerometer Systems with Self–testable Features." *Sensors and Actuators*, No. 20 (1989) pp 153–161.

*Primary Examiner*—David Zarneke
*Assistant Examiner*—Jimmy Nguyen
(74) *Attorney, Agent, or Firm*—Ladas & Parry LLP

(57) ABSTRACT

A sensor comprises a semiconductor pellet (10) including a working portion (11) adapted to undergo action of a force, a fixed portion (13) fixed on the sensor body, and a flexible portion (13) having flexibility formed therebetween, a working body (20) for transmitting an exterted force to the working portion, and detector means (60–63) for transforming a mechanical deformation produced in the semiconductor pellet to an electric signal to thereby detect a force exerted on the working body as an electric signal. A signal processing circuit is applied to the sensor. This circuit uses analog multipliers (101–109) and analog adders/subtracters (111–113), and has a function to cancel interference produced in different directions. Within the sensor, two portions (E3, E4–E8) located at positions opposite to each other and producing a displacement therebetween by action of a force are determined. By exerting a coulomb force between both the portions, the test of the sensor is carried out. Further, a pedestal (21, 22) is provided around the working body (20). The working body and the pedestal are located with a predetermined gap or spacing therebetween. A displacement of the working body is caused to limitatively fall within a predetermined range corresponding to the spacing. The working body and the pedestal are provided by cutting a same common substrate (350, 350').

6 Claims, 26 Drawing Sheets

U.S. PATENT DOCUMENTS

| | | | |
|---|---|---|---|
| 3,190,129 A | 6/1965 | Kritz et al. | |
| 4,789,803 A | 12/1988 | Jacobsen et al. | |
| 4,836,034 A | 6/1989 | Izumi et al. | |
| 4,851,080 A | 7/1989 | Howe et al. | |
| 4,882,933 A | 11/1989 | Petersen et al. | |
| 4,891,985 A | 1/1990 | Glenn | |
| 4,905,523 A | 3/1990 | Okada | 73/862.04 |
| 4,941,354 A | 7/1990 | Russell et al. | |
| 4,967,605 A | 11/1990 | Okada | 73/862.04 |
| 4,969,366 A | 11/1990 | Okada | 73/862.08 |
| 5,014,415 A | 5/1991 | Okada | 29/621.1 |
| 5,035,148 A | 7/1991 | Okada | 73/862.04 |
| 5,051,643 A | 9/1991 | Dworsky et al. | |
| 5,060,504 A | 10/1991 | White et al. | |
| 5,092,645 A | 3/1992 | Okada | 294/86.4 |
| 5,103,667 A | 4/1992 | Allen et al. | |
| 5,124,879 A | 6/1992 | Goto | |
| 5,163,325 A | 11/1992 | White et al. | |
| 5,182,515 A | 1/1993 | Okada | 324/259 |
| 5,263,375 A | 11/1993 | Okada | 73/862.042 |
| 5,295,386 A | 3/1994 | Okada | 73/1 D |
| 5,343,765 A | 9/1994 | Okada | 73/862.043 |
| 5,365,799 A | 11/1994 | Okada | 73/862.041 |
| 5,392,658 A | 2/1995 | Okada | 73/862.043 |
| 5,406,848 A | 4/1995 | Okada | 73/517 R |
| 5,421,213 A | 6/1995 | Okada | 73/862.043 |
| 5,437,196 A | 8/1995 | Okada | 73/862.043 |
| 5,447,051 A | 9/1995 | Hanks et al. | |
| 5,492,020 A | 2/1996 | Okada | 73/862.626 |
| 5,497,668 A | 3/1996 | Okada | 73/862.626 |
| 5,531,002 A | 7/1996 | Okada | 29/25.41 |
| 5,531,092 A | 7/1996 | Okada | 73/1 D |
| 5,571,972 A | 11/1996 | Okada | 73/862.043 |
| 5,639,973 A | 6/1997 | Okada | 73/862.043 |
| 5,646,346 A | 7/1997 | Okada | 73/504.04 |
| 5,668,318 A | 9/1997 | Okada | 73/504.11 |
| 5,682,000 A | 10/1997 | Okada | 73/862.043 |
| 5,744,718 A | 4/1998 | Okada | 73/514.33 |
| 5,757,481 A | 5/1998 | O Brien et al. | |
| 5,780,749 A | 7/1998 | Okada | 73/862.043 |
| 5,811,693 A | 9/1998 | Okada | 73/862.043 |
| 5,831,163 A | 11/1998 | Okada | 73/504.12 |
| 5,850,040 A | 12/1998 | Okada | 73/504.04 |
| 5,856,620 A | 1/1999 | Okada | 73/514.32 |
| 5,962,787 A | 10/1999 | Okada et al. | 73/514.32 |
| 5,987,985 A | 11/1999 | Okada | 73/504.04 |
| 6,003,371 A | 12/1999 | Okada | 73/504.02 |
| 6,053,057 A | 4/2000 | Okada | 73/862.043 |
| 6,076,401 A | 6/2000 | Okada | 73/504.12 |
| 6,098,461 A | 8/2000 | Okada | 73/514.34 |
| 6,158,291 A | 12/2000 | Okada | 73/862.043 |
| 6,159,761 A | 12/2000 | Okada | 438/53 |
| 6,185,814 B1 | 2/2001 | Okada | 29/621.1 |
| 6,205,856 B1 | 3/2001 | Okada | 73/504.11 |
| 6,269,697 B1 | 8/2001 | Okada | 73/504.02 |
| 6,282,956 B1 | 9/2001 | Okada | 73/504.12 |
| 6,314,823 B1 | 11/2001 | Okada | 73/862.043 |
| 6,367,326 B1 | 4/2002 | Okada | 73/504.12 |
| 6,378,381 B1 | 4/2002 | Okada et al. | 73/862.043 |
| 6,474,133 B1 * | 11/2002 | Okada | 73/1.38 |
| 6,477,903 B2 | 11/2002 | Okada | 73/862.043 |
| 6,512,364 B1 * | 1/2003 | Okada | 324/158.1 |
| 6,530,283 B2 | 3/2003 | Okada et al. | 73/780 |

FOREIGN PATENT DOCUMENTS

| | | |
|---|---|---|
| EP | 0133997 | 3/1985 |
| EP | 0368446 | 5/1990 |
| FR | 8710556 | 1/1988 |
| JP | 59208468 | 11/1959 |
| JP | 57146166 | 9/1982 |
| JP | 6166939 | 4/1986 |
| JP | 6385461 | 4/1988 |
| JP | 63169078 | 7/1988 |
| JP | 63266325 | 11/1988 |
| JP | 63266359 | 11/1988 |
| JP | 6410665 | 1/1989 |
| JP | 1263576 | 10/1989 |

* cited by examiner

FIG. 10

|     | Fx | Fy | Fz |
|-----|----|----|----|
| Rx1 | −  | 0  | −  |
| Rx2 | +  | 0  | +  |
| Rx3 | −  | 0  | +  |
| Rx4 | +  | 0  | −  |
| Ry1 | 0  | −  | −  |
| Ry2 | 0  | +  | +  |
| Ry3 | 0  | −  | +  |
| Ry4 | 0  | +  | −  |
| Rz1 | −  | 0  | −  |
| Rz2 | +  | 0  | +  |
| Rz3 | −  | 0  | +  |
| Rz4 | +  | 0  | −  |

F I G. 33
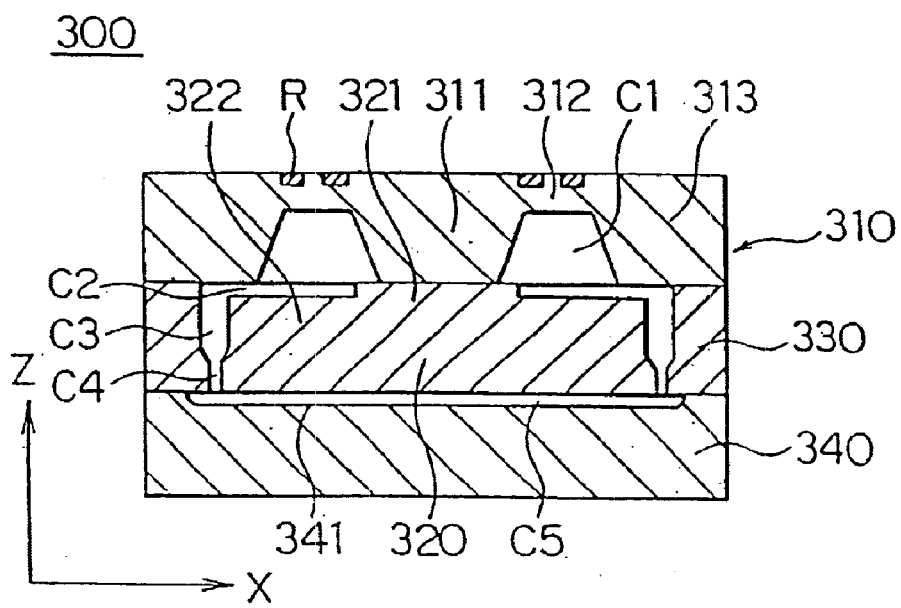
F I G. 34
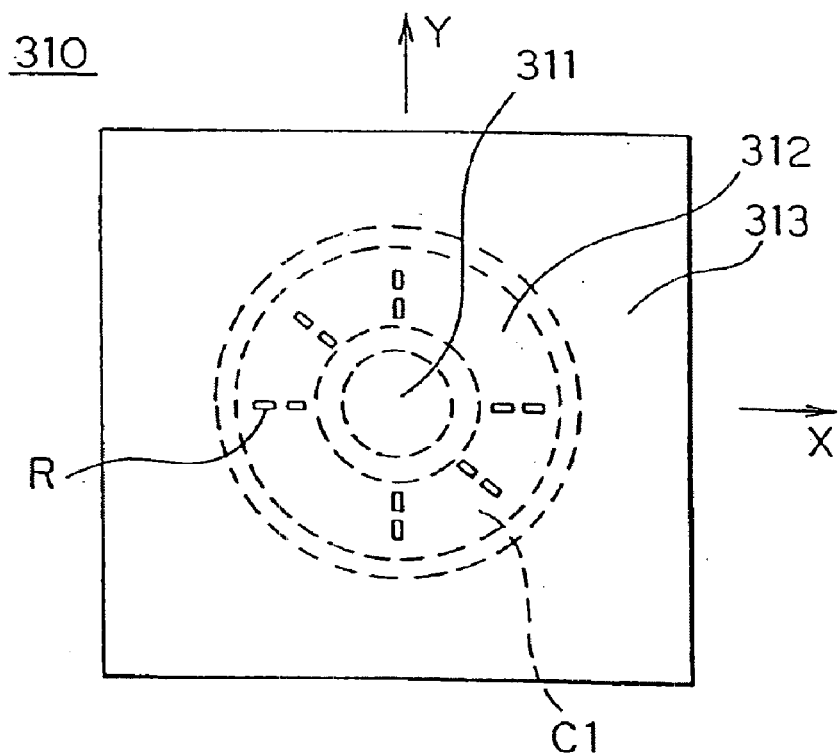

ially, this invention relates to a signal processing...

APPARATUS FOR DETECTING A PHYSICAL QUANTITY ACTING AS AN EXTERNAL FORCE AND METHOD FOR TESTING AND MANUFACTURING THIS APPARATUS

This application is a divisional of copending application Ser. No. 10/298,275 filed on Nov. 15, 2002 which is a divisional of Ser. No. 09/716,773 filed on Nov. 20, 2000 now U.S. Pat. No. 6,512,364, which is a divisional of application Ser. No. 09/019,978 filed on Feb. 6, 1998 (now U.S. Pat. No. 6,185,814), which is a divisional of application Ser. No. 08/641,078 filed on Apr. 26, 1996 (now U.S. Pat. No. 5,744,718), which is a divisional of application Ser. No. 08/393,801 filed Feb. 24, 1995 (now U.S. Pat. No. 5,531,092), which is a divisional of application Ser. No. 08/168,024 filed Dec. 15, 1993 (now U.S. Pat. No. 6,474,133), which is a divisional of application Ser. No. 07/761,771 filed Aug. 14, 1991 (now U.S. Pat. No. 5,295,386) filed as Application No. PCT/JP90/01688 on Dec. 26, 1990 claims the benefit thereof and incorporates the same by reference.

TECHNICAL FIELD

This invention relates to an apparatus for detecting a physical quantity acting as an external force, e.g., a force exerted on a working body, an acceleration exerted on a weight body, or a magnetism exerted on a magnetic body. Particularly, this invention relates to a signal processing circuit, a testing method, and a manufacturing method for a force sensor serving as a main part of such a detector, and a structure of this force sensor.

BACKGROUND ART

In recent years, there are proposed force sensors including, arranged on a semiconductor substrate, resistance elements having a property of the piezo resistive effect that the electric resistance varies in dependency upon a mechanical deformation to detect a force from changes in resistance values of the resistance elements. Further, acceleration sensors or magnetic sensors to which such force sensors are applied are also proposed. In either detector, a strain generative body partially having flexibility is used to detect a mechanical deformation produced in the strain generative body as changes in electric resistance of the resistance elements. A working body is provided for exerting a force on the strain generative body. If a weight body responsive to acceleration is used as the working body, an acceleration sensor is provided. Further, if a magnetic body responsive to magnetism is used as the working body, a magnetic sensor is provided.

For example, in U.S. Pat. No. 4,905,523, U.S. patent applications Ser. No. 295210, Ser. No. 362399, Ser. No. 470102, and No. 559381, force/acceleration/magnetic sensors according to the invention of the inventor of this application are disclosed. Further, in U.S. patent application Ser. No. 526837, a novel manufacturing method for a sensor of this kind is disclosed.

The force sensors disclosed in these patent materials can detect a direction and a magnitude of an external force applied to a predetermined working point on the basis of changes in resistance values of resistance elements formed on a single crystal substrate. If a weight body is formed at the working point, it is also possible to detect, as a force, an acceleration exerted on the weight body. Accordingly, this permits application as an acceleration sensor. Further, if a magnetic body is formed at the working point, it is also possible to detect, as a force, magnetism exerted on the magnetic body. Accordingly, this permits application as a magnetic sensor.

However, the conventional force sensors (or acceleration sensors, or magnetic sensors based on the same principle) have the problem that there may occur interference in the output characteristic with respect to respective axial directions of two-dimensions or three-dimensions. For example, in the case of the three dimensional acceleration sensor, components in the X-axis, Y-axis and Z-axis directions of an acceleration exerted on a predetermined working point must be independently detected, respectively. In the case of conventional sensors, however, these components in respective axial directions interfere with each other. As a result, a detected value of the component in one axial direction was influenced to some extent by detected values of components in other axial directions. Such an interference is not preferable because it lowers reliability of measured values.

With the above in view, a first object of this invention is to provide a signal processing circuit capable of obtaining correct detected values free from interference of the components in other axial directions.

In order to mass produce such sensors to deliver them on the market, it is necessary to conduct a test or inspection at the final stage of the manufacturing process. The test for the force sensor can be carried out relatively with ease. Namely, this test may be accomplished by applying a force of a predetermined magnitude to the working point in a predetermined direction to check a detected output at this time. However, the test for the acceleration sensor or the magnetic sensor becomes more complicated. Since the sensor body is in a sealed state, it is necessary to check detected outputs while actually exerting, from the external, acceleration or magnetism thereon. Particularly, in the case of the acceleration sensor, it is the present state that a vibration generator is used to give vibration to the sensor body to carry out a test. This results in the problem that the testing device becomes large, and a test for a dynamic acceleration of vibration is only conducted.

With the above in view, a second object of this invention is to provide a testing method capable of more easily testing a sensor having a working body of force such as an acceleration sensor or a magnetic sensor, and to provide a sensor having a function capable of immediately carrying out this testing method.

Further, conventionally proposed sensors using resistance elements has a problem in the case of carrying out high sensitivity measurement. For example, in the case of the acceleration sensor, it is sufficient for the purpose of utilizing collision detection of a vehicle, etc. to have a function to detect acceleration of the order of 10 to 100G on the full scale. However, in order to detect a swing by hand of a camera, to conduct a suspension control for a vehicle, and to conduct a control for an antilock brake system for a vehicle, it is necessary to detect an acceleration of the order of 1 to 10G. For carrying out such a high sensitivity acceleration detection, it is necessary to increase the weight of a working body having a function to produce a force on the basis of an acceleration. However, in the case of the structure of conventional sensors, it was difficult to enlarge the working body.

In the case of the high sensitivity sensor, where a large force more than a predetermined limit is applied thereto, the danger that the semiconductor substrate may be damaged is increased. For this reason, it is necessary to provide, around the working body, a member for allowing displacement of the working body to limitatively fall within a predetermined range. This gives another problem that the structure becomes complicated.

Further, in the case of detecting force, acceleration, and magnetism, etc. exerted in three-dimensional directions, there would occur a difference between a detection sensitivity in a direction parallel to the surface of the semiconductor substrate and that in a direction perpendicular thereto. The fact that a sensitivity difference occurs in dependency upon the direction of detection is not particularly preferable for high sensitivity sensors.

With the above in view, a third object of this invention is to provide a sensor using resistance elements suitable for higher sensitivity physical quantity measurement, and a method of manufacturing such a sensor.

DISCLOSURE OF INVENTION

I Feature Relating to the First Object

To achieve the first object to provide a signal processing circuit capable of obtaining a correct detected value free from interference of the components in other axial directions, this invention has the following features.

(1) The first feature resides in a signal processing circuit for a sensor in which when an external force is exerted on a predetermined working point in an XYZ three-dimensional coordinate system, a mechanical deformation is produced on a single crystal substrate by the external force, the sensor detecting a component in the X-axis direction Ax, a component in the Y-axis direction Ay, and a component in the Z-axis direction Az of the external force exerted on the working point on the basis of electric signals Vx, Vy and Vz produced due to the mechanical deformation, wherein coefficients K11, K12, K13, K21, K22, K23, K31, K32 and K33 are determined so that the relational equations expressed below hold between Ax, Ay, Az, Vx, Vy and Vz:

$Ax=K11Vx+K12Vy+K13Vz$ $Ay=K21Vx+K22Vy+K23Vz$ $Az=K31Vx+K32Vy+K33Vz$ and the values of terms of the right sides of the relational equations are computed by using analog multipliers, and a computation between respective terms of the right sides of the relational equations is performed by using analog adders/subtracters, thus to provide detected values Ax, Ay and Az from these computed results.

(2) The second feature resides in a signal processing circuit for an acceleration detector in which when an external force is exerted on a predetermined working point, a mechanical deformation is produced on a single crystal substrate by the external force, the detector detecting a component in an X-axis direction Ax and a component in a Y-axis direction perpendicular thereto of an external force exerted on a working point on the basis of electric signals Vx and Vy produced due to the mechanical deformation, wherein coefficients K11, K12, K21 and K22 are determined so that the relational equations expressed below hold between Ax, Ay, Vx and Vy:

$Ax=K11Vx+K12Vy$ $Ay=K21Vx+K22Vy$ and values of terms of the right sides of the relational equations are computed by using analog multipliers, and a computation between respective terms of the right sides of the relational equations is performed by using analog adders/subtracters, thus to provide detected values Ax and Ay from these computed results.

(3) The third feature resides in a signal processing circuit for a force sensor in which a plurality of resistance elements exhibiting the piezo resistive effect that the electric resistance varies in dependency upon a mechanical deformation are arranged on a single crystal substrate, and when an external force is exerted on a predetermined working point in an XYZ three-dimensional coordinate system and a mechanical deformation is produced by the external force, the sensor detecting a component in the X-axis direction Ax, a component in the Y-axis direction Ay, and a component in the Z-axis direction Az of an external force exerted on a working point on the basis of voltage values Vx, Vy and Vz obtained on the basis of a bridge circuit constituted by the plurality of resistance elements, wherein coefficients K11, K12, K13, K21, K22, K23, K31, K32 and K33 are determined so that the relational equations expressed below hold between Ax, Ay, Az, Vx, Vy and Vz:

$Ax=K11Vx+K12Vy+K13Vz$ $Ay=K21Vx+K22Vy+K23Vz$ $Az=K31Vx+K32Vy+K33Vz$ and the values of terms of the right sides of the relational equations are computed by using analog multipliers, and a computation between respective terms of the right sides of the relational equations is performed by using analog adders/subtracters, thus to provide detected values Ax, Ay and Az from these computed results.

(4) The fourth feature resides in a signal processing circuit for an acceleration detector in which a plurality of resistance elements exhibiting the piezo resistive effect that the electric resistance varies in dependency upon a mechanical deformation, and when an external force is exerted on a predetermined working point, a mechanical deformation is produced on a single crystal substrate by the external force, the detector detecting a component in an X-axis direction Ax and a component in a Y-axis direction Ay perpendicular thereto of an external force exerted on a working point on the basis of respective bridge voltage values Vx and Vy of two sets of bridge circuits constituted by the plurality of resistance elements, wherein coefficients K11, K12, K21 And K22 are determined so that the relational equations expressed below hold between Ax and Ay and Vx and Vy:

$Ax=K11Vx+K12Vy$ $Ay=K21Vx+K22Vy$ and the values of terms of the right side of the relational equations are computed by using analog multipliers, and a computation between respective terms of the right sides of the relational equations is performed by using analog adders/subtracters, thus to provide detected values Ax and Ay from these computed results.

In accordance with the above described signal processing circuit, a characteristic matrix showing the condition of interference produced between components in respective axial directions and an inverse characteristic matrix of the inverse matrix thereof are determined in advance. Further, corrective operations using this inverse characteristic matrix are carried out, thereby making it possible to cancel the influence of interference. Furthermore, since these corrective operations are all carried out at the analog computation circuit, the circuit configuration becomes simple and a correction circuit can be realized at a low cost. In addition, because operation is performed in an analog form, the operation speed becomes high, giving rise to no inconvenience even in the case of measuring an instantaneous phenomenon.

II Feature Relating to the Second Object

To achieve the second object to provide a simple testing method with respect to each sensor, this invention has the following features.

(1) The first feature resides in a method of testing a sensor, the sensor comprising:

a strain generative body including a working portion adapted to undergo action of a force, a fixed portion fixed to a sensor body, and a flexible portion having flexibility formed between the working portion and the fixed portion, a working body for transmitting an applied force to the working portion, and detector means for transforming a mechanical deformation produced in the strain generative body by the transmitted force to an electric signal to thereby detect, as an electric signal, a force exerted on the working body, wherein the method comprises the steps of determining a first portion and a second portion located at positions opposite to each other and producing a displacement therebetween, exerting a coulomb force between both the portions, and testing the sensor on the basis of the exerted coulomb force and a detected result by the detector means.

In accordance with the first feature, a coulomb force is exerted between the first and second portions. By this coulomb force, the first portion undergoes displacement relative to the second portion to induce a mechanical deformation in the strain generative body. Accordingly, the same state as the state where an external force is exerted on the working body can be created. Thus, test of the sensor can be carried out without actually applying an external force thereto.

(2) The second feature resides in, in the method having the above described first feature, a method in which a first electrode layer is formed at the first portion and a second electrode layer is formed at the second portion to carry out a test conducted while exerting a repulsive force between the first and second electrode layers by applying voltages of the same polarity to the both electrode layers, respectively, and a test conducted while exerting an attractive force between the first and second electrode layers by applying voltages of polarities different from each other thereto, respectively.

In accordance with the second feature, by applying a voltage across two opposite electrode layers, a coulomb force can be exerted. In addition, by selecting the polarity of an applied voltage, the coulomb force can be exerted as either a repulsive force or an attractive force. Thus, the test having higher degree of freedom can be conducted.

(3) The third feature resides in a method of testing a sensor, the sensor comprising:

a strain generative body including a working portion adapted to undergo action of a force, a fixed portion fixed to a sensor body, and a flexible portion having flexibility formed between the working portion and the fixed portion, a working body for transmitting an applied force to the working portion, and detector means for transforming a mechanical deformation produced in the strain generative body by the transmitted force to an electric signal to thereby detect, as an electric signal, a force exerted on the working body, wherein the method comprises the steps of determining a first plane surface and a second plane surface located at positions opposite to each other to produce a displacement therebetween by the action of the force, forming an electrode layer on the first plane surface, and forming, on the second plane surface, a plurality of electrically independent electrode layers at a plurality of portions, the method further comprising the steps of applying a voltage of a first polarity to the electrode layer on the first plane surface, and selectively applying, every electrode layers, a voltage of a first polarity or a voltage of a second polarity opposite to the first polarity to the respective electrode layers on the second plane surface to exert a coulomb force of a repulsive force or an attractive force between the electrode layer on the first plane surface and the electrode layers on the second plane surface, and thereafter conducting test of the sensor on the basis of the applied coulomb force and a detected result by the detector means.

In accordance with the third feature, since one electrode layer is divided into a plurality of subelectrode layers, an approach is employed to select the polarity of an applied voltage, thereby making it possible to carry out a test in which a coulomb force is exerted in various directions.

(4) The fourth feature resides in an acceleration sensor comprising:

a strain generative body including a working portion adapted to undergo action of a force, a fixed portion fixed to a sensor body, and a flexible portion having flexibility formed between the working portion and the fixed portion, a weight body adapted to undergo action of a force by an acceleration applied to the sensor body, the weight body transmitting the force thus exerted to the working portion and allowing the stain generative body to produce a mechanical deformation, a resistance element having the property that the resistance value varies in dependency upon a mechanical deformation produced in the strain generative body, a first electrode layer formed on a first plane surface to produce a displacement by action of an acceleration, a second electrode layer formed on a second plane surface opposite to the first plane surface, and wiring means for connecting the resistance element, the first electrode layer and the second electrode layer to an external electric circuit, to apply a predetermined voltage to the first and second electrode layers to exert a coulomb force between both the electrode layers, thereby permitting the strain generative body to produce a mechanical deformation even in the state where no acceleration is exerted.

In accordance with the fourth feature, within the acceleration sensor, two electrode layers for carrying out the test according to the above described first feature are formed, and wiring therefor is implemented. Accordingly, by only connecting a predetermined electric circuit to this acceleration sensor, the test can be carried out.

(5) The fifth feature resides in a magnetic sensor comprising:

a strain generative body including a working portion adapted to undergo action of a force, a fixed portion fixed to a sensor body, and a flexible portion having flexibility formed between the working portion and the fixed portion, a magnetic body adapted to undergo action of a force by a magnetic field where the sensor body is placed, the magnetic body transmitting the force thus exerted to the working portion and allowing the strain generative body to produce a mechanical deformation, a resistance element having the property that the resistance value varies in dependency upon a mechanical deformation produced in the strain generative body, a first electrode layer formed on a first plane surface to produce a displacement by action of a magnetic force, a second electrode layer formed on a second plane surface opposite to the first plane surface, and wiring means for connecting the resistance element, the first electrode layer and the second electrode layer to an external electric circuit, to apply a predetermined voltage to the first and second electrode layers to exert a coulomb force between both the electrode layers, thereby permitting the strain generative body to produce a mechanical deformation even in the state where no magnetic force is exerted.

In accordance with the fifth feature, within the magnetic sensor, two electrode layers for carrying out the test according to the above described first feature are formed, and wiring therefor is implemented. Accordingly, by only connecting a predetermined electric circuit to this magnetic sensor, the test can be carried out.

(6) The sixth feature is directed to a sensor having the above described fourth or fifth feature, characterized in that one of the first and second electrode layer is constituted with a single electrode layer, and the other electrode layer is constituted with a plurality of electrically independent subelectrode layers, to select the polarities of voltages applied to the respective subelectrode layers, thereby permitting a mechanical deformation produced in the strain generative body to have directivity.

In accordance with the sixth feature, since one electrode layer is constituted with a single electrode layer, and the other electrode layer is constituted with a plurality of subelectrode layers, selection of the polarities of applied voltages is made, thereby making it possible to conduct a test in which a coulomb force is exerted in various directions.

(7) The seventh feature is directed to a sensor having the above described sixth feature, characterized in that the other electrode layer is constituted with two electrically independent subelectrode layers to select the polarities of voltages applied to respective subelectrode layers, thereby allowing the strain generative body to produce a mechanical deformation with respect to a direction of a line connecting the centers of two subelectrode layers, and a mechanical deformation with respect to a direction perpendicular to the surfaces of the two subelectrode layers.

In accordance with the seventh feature, since two subelectrode layers are provided, a test in which a coulomb force is exerted with respect to two directions perpendicular to each other can be conducted.

(8) The eighth feature is directed to a sensor having the above described sixth feature, characterized in that the other electrode layer is constituted with four electrically independent subelectrode layers, and these subelectrode layers are arranged at respective end point positions of two orthogonal line segments so as to select the polarities of voltages applied to the respective subelectrode layers, thereby allowing the strain generative body to produce a mechanical deformation, with respect to a direction of a first line segment of the two line segments, and a mechanical deformation with respect to a direction perpendicular to the surfaces of the four subelectrode layers.

In accordance with the eighth feature, since four subelectrode layers are provided in a crossing manner, a test in which a coulomb force is exerted with respect to three directions perpendicular to each other can be conducted.

(9) The ninth feature is directed to a sensor having the above described fourth or fifth feature characterized in that the first electrode layer and the second electrode layer are constituted with a plurality of electrically independent first subelectrode layers and a plurality of electrically independent second subelectrode layers, respectively, so as to select polarities of voltages applied to the respective subelectrode layers, thereby permitting a mechanical deformation produced in the strain generative body to have directivity.

In accordance with the ninth feature, selection having higher degree of freedom can be made Thus, a test in which a coulomb force is exerted in various directions can be conducted.

III Feature Relating to the Third Object

To achieve the third object to provide a sensor suitable for a higher sensitivity physical quantity measurement and a method of manufacturing such a sensor, this invention has the following features.

(1) The first feature resides in a sensor comprising:

a substrate wherein a working portion, a flexible portion and a fixed portion are defined substantially at the center of the substrate, around the working portion and around the flexible portion, respectively, to dig a groove in the flexible portion on the lower surface of the substrate, or to form a through hole in the flexible portion of the substrate to thereby allow the flexible portion to have flexibility and a resistance element is formed of which electric resistance varies on the basis of a mechanical deformation of the flexible portion on the upper surface of the substrate so as to detect changes in the electric resistance of the resistance element, produced on the basis of a displacement relative to the fixed portion of the working portion, a working body for transmitting a force to the working portion being connected to the lower surface of the working portion, a pedestal for supporting the fixed portion being connected to a first portion on the lower surface of the fixed portion, wherein a second portion on the lower surface of the fixed portion and a portion on the upper surface of the working body being constituted so that they are opposite to each other with a predetermined spacing therebetween, a displacement in an upper direction of the working body being permitted to limitatively fall within a predetermined range by the second portion.

In accordance with the first feature, the central portion on the upper surface of the working body is connected to the lower surface of the working portion of the substrate, but the side portion of the working body extends to the portion below the fixed portion of the substrate. Accordingly, it is possible to make a design so that the volume of the working body is large as a whole. As a result, the weight of the working body is increased, thus making it possible to improve sensitivity with ease. Further, since the side portion of the working body extends up to the portion below the fixed portion of the substrate, it is possible to limit a displacement in an upper direction of the working body by making use of the fixed portion lower surface of the substrate as a control member. Accordingly, the necessity of individually providing a control member in an upper direction is eliminated, thus permitting the structure to be simple.

(2) The second feature is directed to a sensor having the above described first feature, wherein the inside surface of the pedestal and the outside surface of the working body are constituted so that they are opposite with a predetermined spacing therebetween, thus making it possible to allow a displacement in a lateral direction of the working body to limitatively fall within a predetermined range by the inside surface of the pedestal.

In accordance with the second feature, in addition to the first feature, the inside surface of the pedestal and the outside surface of the working body are constituted so that they are opposite to each other with a predetermined spacing therebetween. For this reason, it is possible to limit a displacement in a lateral direction of the working body by making use of the inside surface of the pedestal as a control member. Accordingly, the necessity of individually providing a limit member in a lateral direction is eliminated, thus permitting the structure to be simple.

(3) The third feature is directed to a sensor having the first or second feature, wherein the pedestal is fixed onto a predetermined control surface so that the control surface and the lower surface of the working body are opposite to each other with a predetermined spacing therebetween, thus making it possible to allow a displacement in a lower direction of the working body to limitatively fall within a predetermined range by the control surface.

(4) The fourth feature resides in a sensor comprising:

a substrate wherein a working portion, a flexible portion and a fixed portion are defined substantially at the center of the substrate, around the working portion and around the flexible portion, respectively, to dig a groove in the flexible portion on the lower surface of the substrate, or to form a through hole in the flexible portion of the substrate to thereby allow the flexible portion to have flexibility and a transducer is formed for transforming a mechanical deformation to an electric signal at the flexible portion on the upper surface of the substrate so as to detect changes in an electric signal produced on the basis of a displacement relative to the fixed portion of the working portion to thereby detect a physical quantity exerted on the working portion, a working body for transmitting a force to the working portion being connected to the lower surface of the working portion, wherein, when it is assumed that a perpendicular is drawn downward from the center of gravity G of the working body onto the upper surface of the substrate, the relationship expressed as L<r holds between a length L of the perpendicular and a distance r from the foot P of the perpendicular up to the outside portion of the groove.

This fourth feature is based on the fact that the inventor of this application has found an optimum range in respect of a distance between a working point defined at the central portion on the upper surface of the substrate and the center of gravity of the working body. This optimum range satisfies such condition that sensitivities with respect to all directions substantially become uniform at the time of detecting a physical quantity in a three dimensional direction. For this reason, a sensor in which there is no difference between detection sensitivities dependent upon direction can be realized.

(5) The fifth feature resides in a method of manufacturing a sensor using resistance elements, the method comprising the steps of:

defining a flexible area in the form of a square ring having a width on a first substrate, defining a working area and a fixed area at one of the portion inside the square ring and the portion outside the square ring and at the other portion, respectively, forming resistance elements within the flexible area on a first plane surface of the first substrate, digging a groove in the form of parallel crosses in correspondence with the square ring position on a second plane surface of the first substrate to form, in the flexible area, a groove in the form of square comprised of a portion of the groove in the form of parallel crosses, thus allowing the flexible area to have flexibility, connecting a first plane surface of a second substrate to the second plane surface of the first substrate, and cutting the second substrate to thereby form a working body connected to the working area of the first substrate and comprised of a portion of the second substrate, and a pedestal connected to the fixed area of the first substrate and comprised of a portion of the second substrate.

In accordance with the fifth feature, a groove in the form of square is formed in the flexible area on the second plane surface of the first substrate. Since the groove in the form of square can be easily formed by digging a groove in the form of parallel crosses by mechanical processing, it is possible to efficiently form a precise groove. Further, the weight body or the magnetic body is formed by a portion of the second substrate, and the pedestal for supporting the first substrate is formed by another portion. Namely, prior to carrying out the dicing process, the weight body or the magnetic body and the pedestal can be formed every wafer.

(6) The sixth feature resides in a method of manufacturing a sensor using resistance elements, the method comprising the steps of:

defining a plurality of unit areas on a first substrate, and, within each unit area, defining a flexible area in the form of a square ring having a width, and defining a working area and a fixed area at one of the portion inside the square ring and the portion outside the square ring and at the other portion, respectively, forming resistance elements in each flexible area on a first plane surface of the first substrate, digging a plurality of grooves on the side of a second plane surface of the first substrate in a longitudinal direction and in a lateral direction, respectively, to form four grooves along four boundary sides of the working area or the fixed area, thus allowing the flexible areas to have flexibility by these grooves, connecting a first plane surface of the second substrate to the second surface of the first substrate, cutting the second substrate to thereby form, within each unit area, a working body connected to the working area of the first substrate and comprised of a portion of the second substrate, and a pedestal connected to the fixed area of the first substrate and comprised of a portion of the second substrate, and cutting off, every unit area, the first and second substrates to form sensors independent each other.

In accordance with the sixth feature, a plurality of unit areas are defined on the first substrate, and the processing proceeds at the same time with respect to respective plurality of unit areas. Finally, one unit area will constitute one sensor unit. A plurality of grooves are dug in a longitudinal direction and in a lateral direction on the second plane surface of the first substrate, respectively. Within each unit area, respective four grooves are formed along four boundary sides of the working area or the fixed area. By these grooves flexibility is given to the flexible area. Since it is sufficient to form grooves longitudinally and laterally in a matrix form, these grooves can be easily dug by mechanical processing. Thus, precise grooves can be efficiently formed.

BRIEF DESCRIPTION OF THE DRAWINGS

FIG. 10 is a table showing the detecting operation of the sensor shown in FIG. 1, FIG. 33 is a cross sectional view of the detail of the center portion shown in FIG. 32, FIG. 34 is a top view of the semiconductor pellet 310 shown in FIG. 33.

BEST MODE FOR CARRYING OUT THE INVENTION

§1 Basic Structure of the Sensor 1.1 Structure of the Acceleration Sensor

This invention can be widely applied, in general, to an apparatus for detecting a physical quantity exerted as an external force, and can be utilized not only to a force sensor but also to an acceleration sensor, or a magnetic sensor. In other words, all sensors are common in the basic structure of the central portion thereof. Accordingly, the object to which this invention is applied will be briefly described by taking an example of an acceleration sensor.

Figure 1:
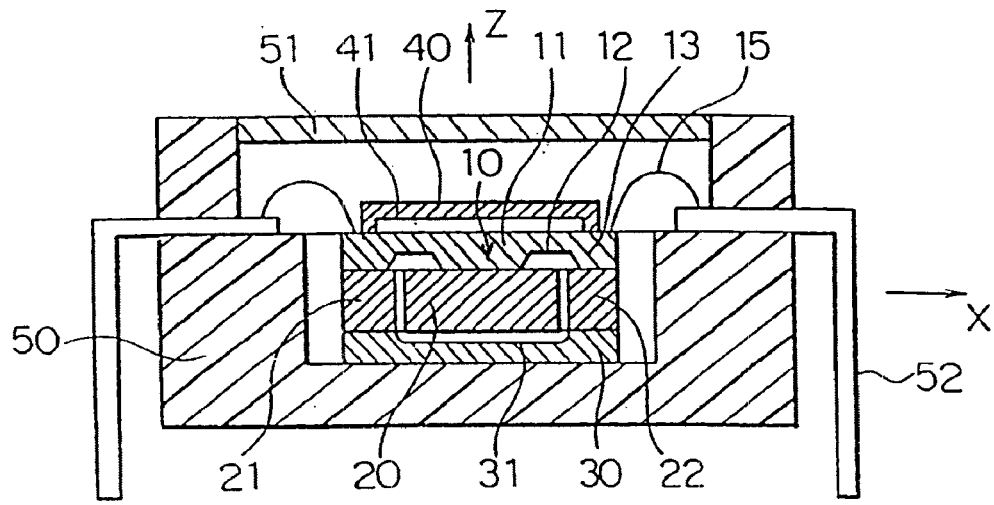
FIG. 1 is a cross sectional view of an acceleration sensor subject to the application of this invention.
Figure 2:
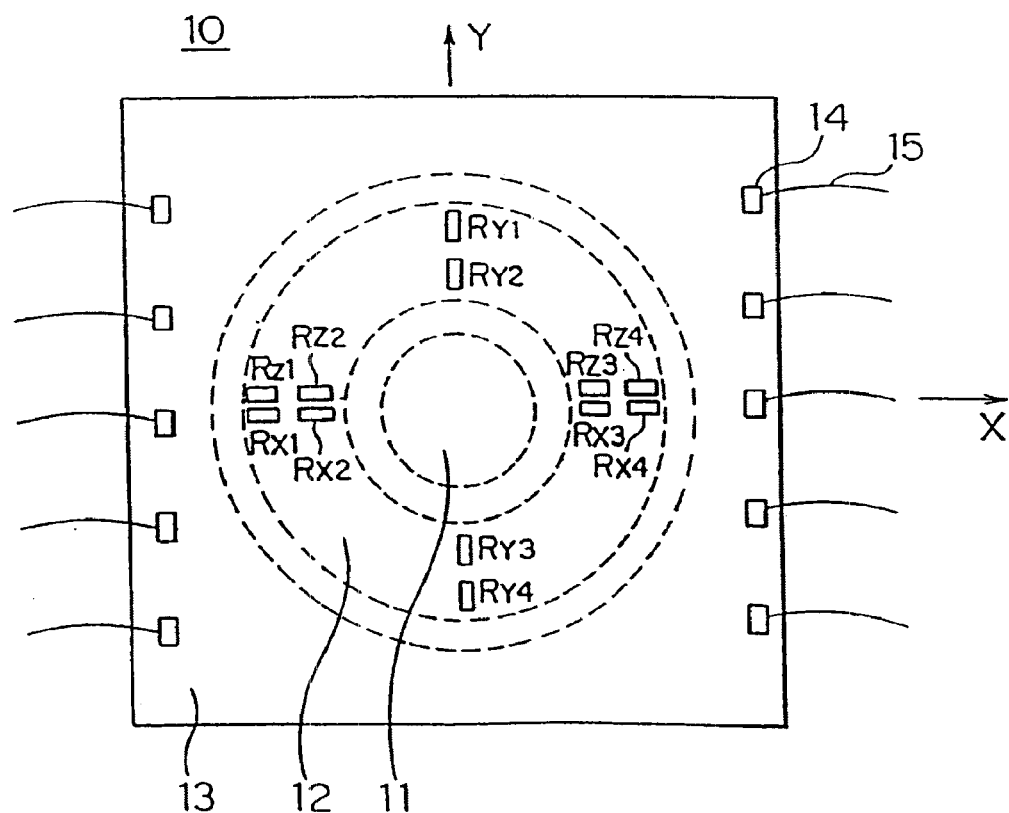
FIG. 2 is a top view of a semiconductor pellet serving as the center of the sensor of FIG. 1.

FIG. 1 is a structural cross sectional view showing an example of an acceleration sensor. The component serving as the central unit of this sensor is a semiconductor pellet 10. In this example, a single crystal substrate of silicon is used. The top view of the semiconductor pellet 10 is shown in FIG. 2. The cross section of the semiconductor pellet 10 shown at the central portion of FIG. 1 corresponds to the cross section cut along the X-axis of FIG. 2. This semiconductor pellet 10 is divided into three areas of a working portion 11, a flexible portion 12, and a fixed portion 13 in order from the inside toward the outside. As indicated by broken lines in FIG. 2, an annular groove is formed on the side of the lower surface of the flexible portion 12. The thickness of the flexible portion 12 is allowed to be thin by this groove to have flexibility. Accordingly, when a force is exerted on the working portion 11 with the fixed portion 13 being fixed, the flexible portion 12 is bent to produce a mechanical deformation. Thus, the semiconductor pellet 10 has a function as a strain generative body. On the upper surface of the flexible portion 12, as shown in FIG. 2, resistance elements Rx1 to Rx4, Ry1 to Ry4, and Rz1 to Rz4 are formed in predetermined directions, respectively.

Figure 3:
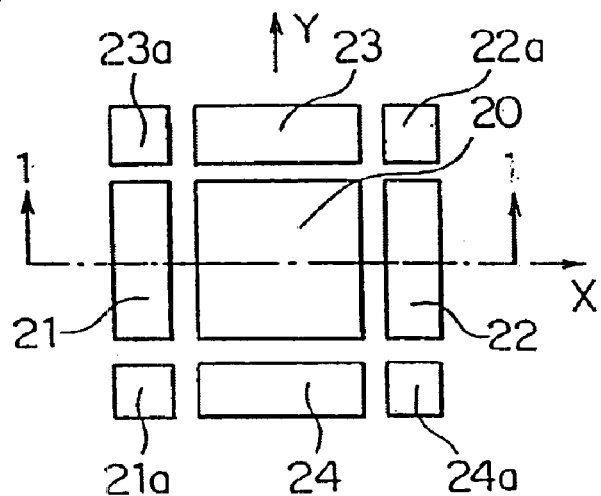
FIG. 3 is a top view of a weight body and a pedestal of the sensor of FIG. 1.
Figure 4:
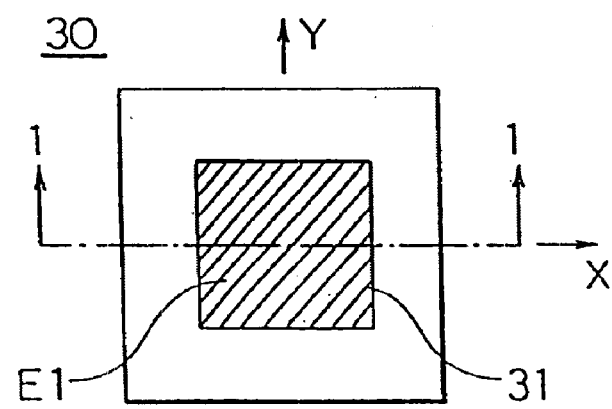
FIG. 4 is a top view of a lower part control member of the sensor of FIG. 1.
Figure 5:
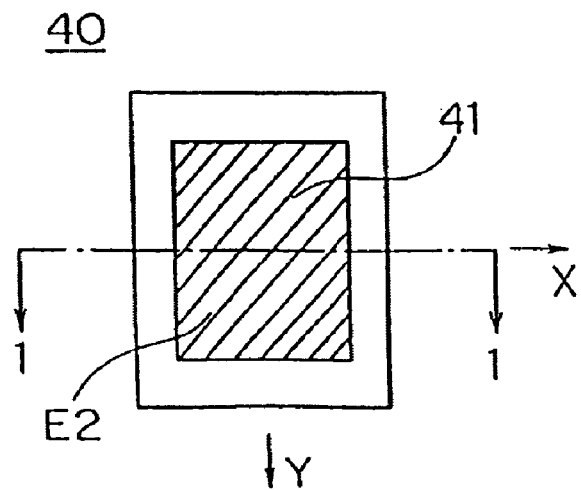
FIG. 5 is a bottom view of an upper part control member of the sensor of FIG. 1, FIGS. 6a to 6c are circuit diagrams of a bridge constructed with respect to the sensor of FIG. 1, respectively.

As shown in FIG. 1, a weight body 20 is connected at the lower part of the fixed portion 13, and pedestals 21 and 22 are connected at the lower part of the fixed portion 13. Since a silicon substrate is used as the semiconductor pellet 10, it is preferable to use borosilicate glass such as Pyrex, etc., having a coefficient of thermal expansion nearly equal to that of silicon. Further, although not shown in FIG. 1, pedestals 23 and 24 are further arranged in a direction perpendicular to plane surface of paper, and pedestals 21a to 24a are arranged in an oblique direction. How they are arranged is clearly shown in FIG. 3 showing the upper surface of only the weight body 20 and the pedestals 21 to 24, and 21a to 24a. The cross section shown in FIG. 1 corresponds to the cross section cut along the cutting-plane line 1—1 of FIG. 3. It is to be noted that the reason why the pedestals are arranged in the state as shown in FIG. 3 is due to the fact that the manufacturing process disclosed in the U.S. patent application Ser. No. 526837 (European Patent Application No. 90110066.9) has been carried out. Make reference to this specification in connection with the detail thereof. A control member 30 is connected at the lower parts of the pedestals 21 to 24. The top view of the control member 30 is shown in FIG. 4. A square groove 31 (the hatched portion in FIG. 4: As described later, the hatched portion of this figure does not indicate the cross section, but indicates the portion where an electrode is to be formed) is formed on the upper surface of the control member 30. The cross section shown in FIG. 1 corresponds to the cross section along the cutting-plane line 1—1 of FIG. 4. A control member 40 is fitted over the upper surface of the semiconductor pellet 10. The lower surface of the control member 40 is shown in FIG. 5. A square groove (the hatched portion in FIG. 5: As described later, the hatched portion of this figure does not indicate the cross section, but indicates the portion where an electrode is to be formed) is formed on the lower surface of the control member 40. The cross section shown in FIG. 1 corresponds to the cross section cut along the cutting-plane line 1—1 of FIG. 5.

The bottom surface of the control member 30 is connected to the inside bottom surface of a package 50, as shown in FIG. 1, and the semiconductor pellet 10 and the weight body 20 are supported by the pedestals 21 to 24, and 21a to 24a. The weight body 20 is in a hanging state within the sensor body. A cover 51 is fitted over the package 50 Bonding pads 14 provided on the semiconductor pellet 10 are electrically connected to respective resistance elements within the pellet. These bonding pads 14 and leads 52 for external wiring provided on the sides of the package are connected by means of bonding wires 15.

When an acceleration is applied to this sensor, an external force is exerted on the weight body 20. This external force is transmitted to the working portion 11. As a result, a mechanical deformation is produced in the flexible portion 12. Thus, there occur changes in the electric resistance values of the resistance elements. Such changes can be taken out to the external through bonding wires 15 and leads 52. A component in the X-direction of a force applied to the working portion 11 is detected by changes in the electric resistance values of the resistance elements Rx1 to Rx4. A component in the Y-direction thereof is detected by changes in the electric resistance values of the resistance elements Ry1 to Ry4, and a component in the Z-direction thereof is detected by the electric resistance values of the resistance elements Rz1 to Rz4. This detection method will be described later.

In the case where this sensor is put into practice as an acceleration sensor, when a large acceleration is applied, an excessive force exerted on the weight body 20. As a result, a large mechanical deformation is produced in the flexible portion 12, resulting in the possibility that the semiconductor pellet 10 may be broken. To prevent such a breakage, in the case of the sensor shown in FIG. 1, the control members 30 and 40 are provided. The control member 30 serves to effect a control such that a displacement in a lower direction of the weight body 20 does not exceed an allowed value, and the control member 40 serves to effect a control such that a displacement in an upper direction of the weight body 20 (the working portion 11 in practice) does not exceed an allowed value. Further, pedestals 21 to 24 serve to effect a control such that a displacement in a lateral direction of the weight body 20 does not exceed an allowed value. Even if an excessive external force is exerted on the weight body 20 to exceed to the above described allowed value so that the weight body 20 attempts to move, the weight body 20 collides with these members, so the movement thereof is prevented. Eventually, there is no possibility that a mechanical deformation more than an allowed value is applied to the semiconductor pellet 10. Thus, the semiconductor pellet 10 is protected from being broken.

As shown in FIG. 2, a plurality of resistance elements R (Rx1 to Rx4, Ry1 to Ry4, Rz1 to Rz4) are formed on the upper surface of the semiconductor pellet 10. These resistance elements R are resistance elements having the piezo resistive effect that the electric resistance varies in dependency upon a mechanical deformation, and are arranged on the upper surface of the flexible portion 12 in predetermined directions, respectively. Leads 52 for external wiring are introduced from the inside of the package 50 to the outside in a manner to pass through wiring holes at the side surfaces. The inside terminals of the leads 52 for external wiring are connected to bonding pads 14 (of which indication is omitted in FIG. 1) provided on the fixed portion 13 of the semiconductor pellet 10. These bonding pads 14 are connected to the resistance elements R by a wiring pattern (not shown). Accordingly, if the leads 52 for external wiring are electrically connected to an external control unit (of which indication is omitted), changes in the resistance values of the resistance elements R can be measured by the external control unit.

1.2 Operation of the Acceleration Sensor

Figure 6A:
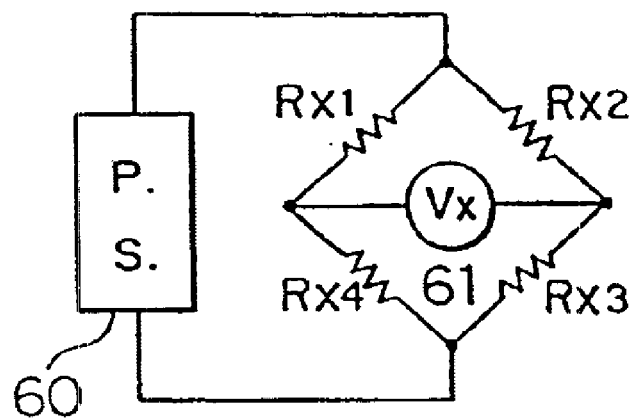
Figure 6B:
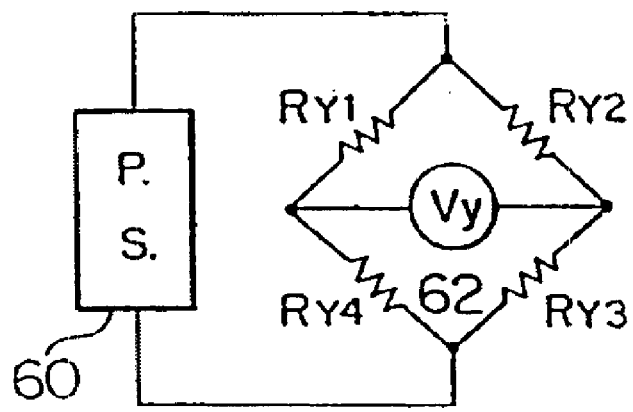
Figure 6C:
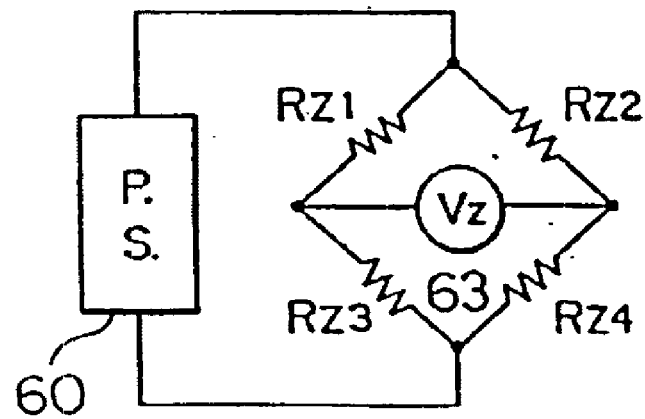

Assuming now that an X-axis, a Y-axis and a Z-axis are taken in a right direction of FIG. 2., in an upper direction thereof, and in a direction perpendicular to the plane surface of paper (in an upper direction of the figure in FIG. 1), respectively, an XYZ three-dimensional coordinate system is defined. In this coordinate system, four resistance elements Rx1 to Rx4 are arranged on the X-axis, and are used for detection of an acceleration component in the X-axis direction; four resistance elements Ry1 to Ry4 are arranged on the Y-axis, and are used for detection of an acceleration commonent in the Y-axis direction; and four resistance elements Rz1 to Rz4 are arranged along the X-axis in the vicinity of the X-axis, and are used for detection of an acceleration component in the Z-axis direction. While resistance elements Rz1 to Rz4 may be arranged on an arbitrary axis, it is preferable to arrange them at suitable positions where crystal dependency of the piezo resistive effect is taken into consideration. As previously described, these respective resistance elements R are electrically connected to the external control unit through leads 52 for external wiring. Within the control unit, bridge circuits as shown in FIGS. 6a to 6c are constructed with respect to respective resistance elements R. Namely, with respect to resistance elements Rx1 to Rx4, a bridge circuit as shown in FIG. 6a is constructed; with respect to resistance elements Ry1 to Ry4, a bridge circuit as shown in FIG. 6b is constructed; and with respect to resistance elements Rz1 to Rz4, a bridge circuit as shown in FIG. 6c is constructed. Predetermined voltages or currents are delivered from power supplies 60 from the bridge circuits, respectively. Thus, bridge voltages are measured by voltage meters 61, 62 and 63, respectively.

As shown in FIG. 1, the weight body 20 is in a hanging state within a central portion space encompassed by the peripheral pedestals 21 to 24. When an acceleration is applied to the package 50, an external force is exerted on the weight body 20 due to this acceleration. As a result, the weight body 20 is subjected to displacement from a fixed position. Accordingly, the working portion 11 connected to the weight body is also subjected to displacement from the fixed position. A mechanical strain produced by this displacement is absorbed by a mechanical deformation of the flexible portion 12. When there occurs a mechanical deformation in the flexible portion 12, the electric resistance values of the resistance elements R formed on the flexible portion 12 vary. As a result, the equilibrium conditions of the bridge circuits shown in FIGS. 6a to 6c are broken, so needles of the voltage meters 61, 62 and 63 swing. This is the basic principle of detection of acceleration by this apparatus.

Now, when resistance elements R are arranged as shown in FIG. 2, an acceleration component in the X-axis direction is detected by the voltage meter 61, an acceleration component in the Y-axis direction is detected by the voltage meter 62, and an acceleration component in the Z-axis direction is detected in the bridge circuits of FIGS. 6a to 6c. The reason therefor will now be described.

Figure 7A:
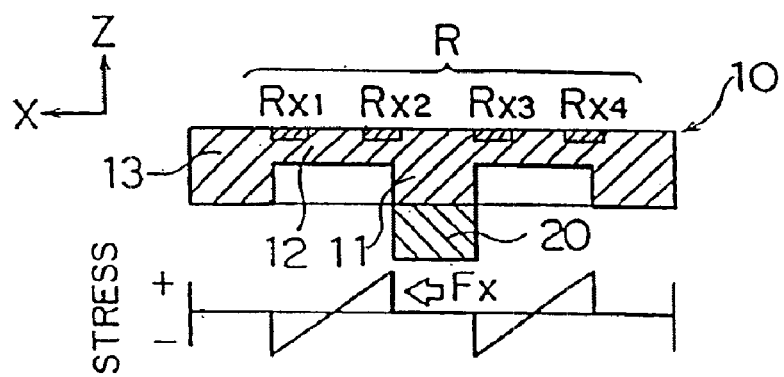
FIGS. 7a to 7c show stress distribution diagrams when a force in the X-axis direction is exerted on the sensor shown in FIG. 1, respectively.
Figure 7B:
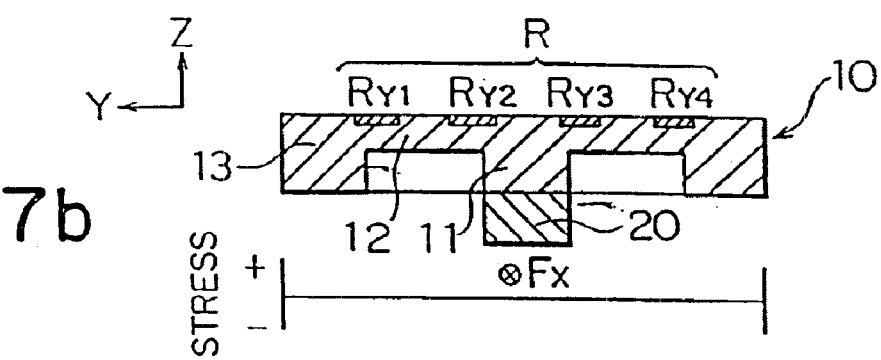
Figure 7C:
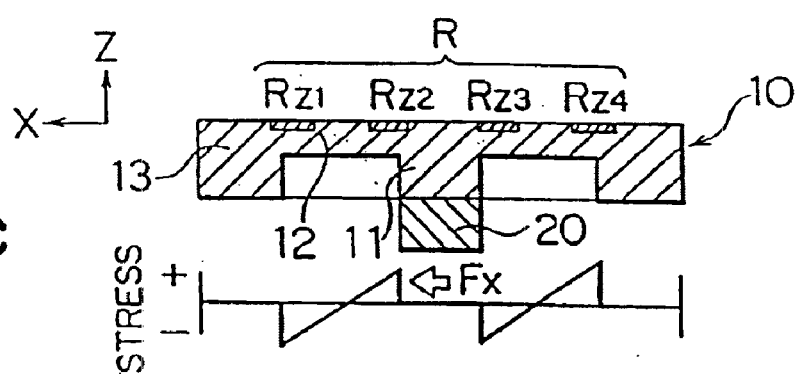
Figure 8A:
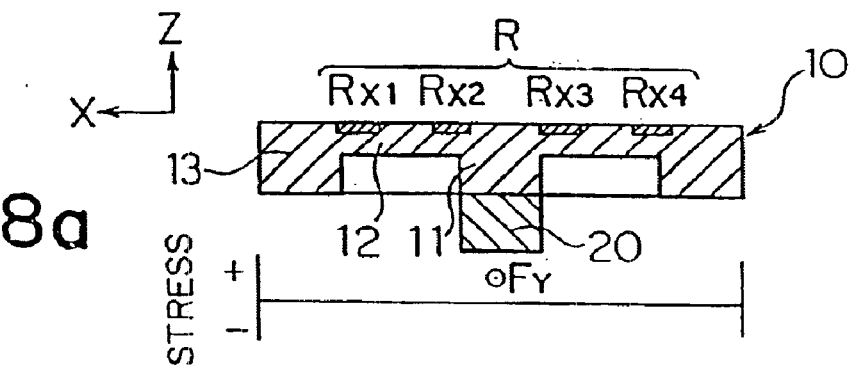
FIGS. 8a to 8c show stress distribution diagrams when a force in the Y-axis direction is exerted on the sensor shown in FIG. 1, respectively.
Figure 8B:
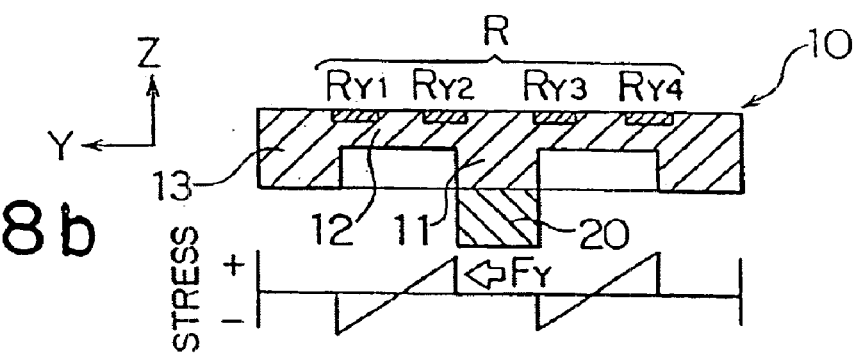
Figure 8C:
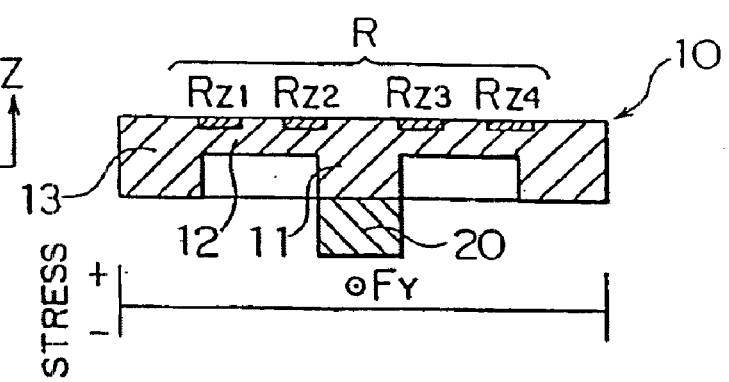
Figure 9A:
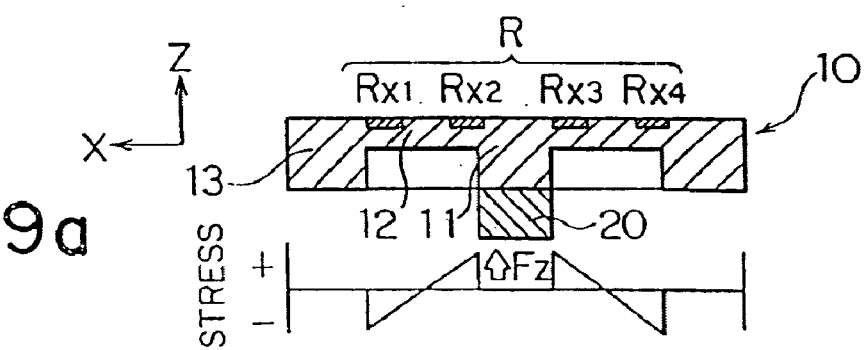
FIGS. 9a to 9c show stress distribution diagrams when a force in the Z-axis direction is exerted on the sensor shown in FIG. 1, respectively.
Figure 9B:
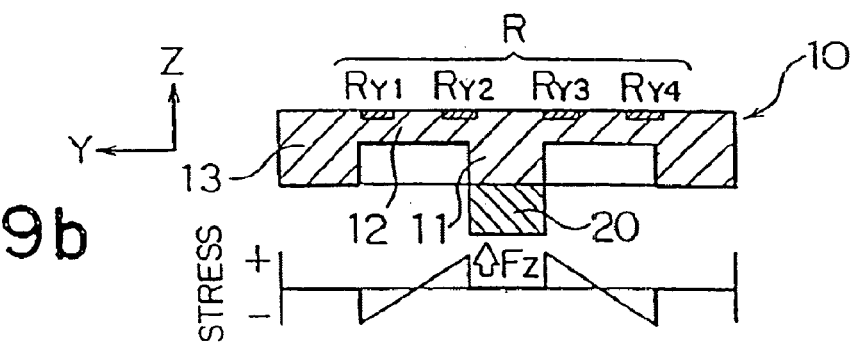
Figure 9C:
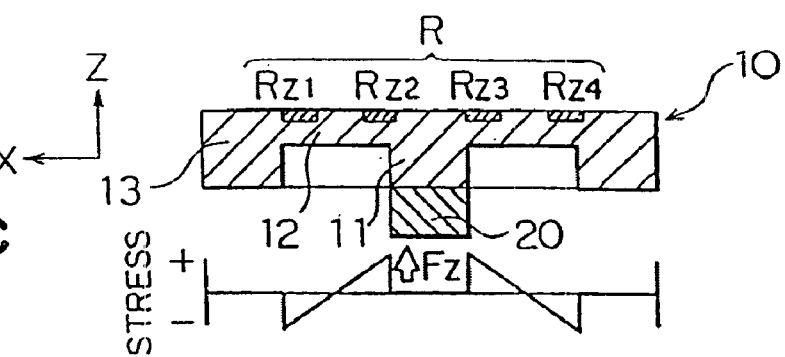

FIGS. 7a to 7c are model views showing stress strain applied to each resistance element R when a force Fx in the X-axis direction is exerted on the weight body 20. FIG. 7a shows a stress distribution in the cross section along the resistance elements Rx1 to Rx4, FIG. 7b shows a stress distribution in the cross section along the resistance elements Ry1 to Ry4, and FIG. 7c shows a stress distribution in the cross section along the resistance elements Rz1 to Rz4. In these stress distributions, an expanding direction is indicated by sign + and a contracting direction is indicated by sign − For example, FIG. 7a shows a stress distribution in the cross section along the resistance elements R1 to R4 when a force Fx in an X-direction is exerted on the weight body 20. The force Fx exerted on the weight body 20 acts as a moment force on the surface of the semiconductor pellet 10. As a result, mechanical deformations in a contracting direction are produced with respect to resistance elements Rx1 and Rx3, and mechanical deformations in an expanding direction are produced with respect to resistance elements Rx2 and Rx4. On the contrary, with respect to resistance elements Ry1 to Ry4, as shown in FIG. 7b, stress does not change. This is because the arrangement direction (Y-axis direction) of the resistance elements Ry1 to Ry4 is orthogonal to the direction of the force Fx. With respect to resistance elements Rz1 to Rz4, as show in FIG. 7c, the same changes as those of the resistance elements Rx1 to Rx4 occur. Similarly, the stress distributions produced in respective resistance elements R in the case where a force Fy in a Y-axis direction is exerted are shown in FIGS. 8a to 8c, and the stress distributions produced in respective resistance elements R in the case where a force Fz in a Z-axis direction is exerted are shown in FIGS. 9a to 9c. Here, if there is used a resistance element having a property such that the resistance value increases with respect to a mechanical deformation in an expanding direction, and that the resistance value decreases with respect to a mechanical deformation in a contracting direction, the relationship between forces Fx, Fy and Fz exerted on the weight body 20 and changes in the resistance values of respective resistance elements R is as shown in the Table of FIG. 10. Here, sign + and sign − indicate an increase in the resistance value and a decrease in the resistance value, and 0 indicates that the resistance value is unchanged.

By making reference to this Table and the bridge circuits of FIGS. 6a to 6c, it will be understood that a force Fx is detected by the voltage meter 61, a force Fy is detected by the voltage meter 62, and a force Fz is detected by the voltage meter 63. For example, in the case where a force Fx is exerted, since resistance values of one opposite sides both increase, whereas resistance values of the other opposite sides both decreases in the bridge circuit of FIG. 6a, the needle of the voltage meter 61 swings. However, since there is no change in either resistance value in the bridge circuit of FIG. 6b, the needle of the voltage meter 62 does not swing. In addition, since the resistance values of one resistance constituting respective opposite sides increase, whereas those of the other resistance decrease in the bridge circuit of FIG. 6c, they are eventually canceled with each other, so that the needle of the voltage meter 63 does not swing. Thus, components in respective components of an acceleration exerted on the detector body are detected as swings of the needles of the voltage meters 61 to 63.

It is to be noted that while explanation has been given in connection with a three dimensional acceleration detector for components in an acceleration direction of all the three axes of XYZ, a two dimensional acceleration detector for detecting components in an acceleration direction with respect to two axes of XY, YZ or XZ may be similarly constructed. In this case, it is sufficient to provide only resistance elements and bridge circuits with respect to two axes. Further, while there has been shown here the example where three sets of bridges are used to detect respective acceleration components in three axis directions, this invention can be applied to an apparatus in which two sets of bridges are used to detect respective acceleration components in three axial directions (e.g., U.S. Pat. No. 4,745,812). In addition, while explanation has been made here by taking an example of an acceleration detector, if a magnetic body is used instead of the weight body 20, this detector serves as a magnetic detector for detecting magnetism exerted on a magnetic body, and if there is employed a structure such that an external force is directly exerted to the weight body 20, the detector serves as a force detector.

§2 Signal Processing Circuit
2.1 Basic Principle of the Signal Processing A signal processing circuit according to this invention will now be described. As described above, force (or acceleration or magnetism) subject to detection, is detected with respect to the component in the X-axis direction by voltage value Vx at the voltage meter 61, is detected with respect to the component in the Y-axis direction by voltage value Vy at the voltage meter 62, and is detected with respect to the component in the Z-axis direction by voltage value Vz at the voltage meter 63. It is to be noted that, in an apparatus for detecting components in three axis directions by using two sets of bridges, voltage values obtained by performing computation on the basis of bridge voltages are used as Vx, Vy and Vz in place of bridge voltage themselves. Assuming that respective resistance elements R are arranged as shown in FIG. 2, under the condition where these respective resistance elements all have the same resistance value and all have the same temperature characteristic, and resistance changes due to distortion are all equal to each other, components in respective axial directions thus detected are provided as entirely independent detected values from a theoretical point of view, giving rise to no interference. However, in the case of actually forming respective resistance elements, since such an ideal condition is not provided, interference would occur between detected values. How this interference occurs can be actually measured. Namely, an approach is employed to exert a force (or acceleration or magnetism) having an already known magnitude in a predetermined direction to make an actual measurement of detected values (reads of respective voltage meters) obtained at this time. As a result, it is known that a characteristic matrix expressed below is provided:

$$\begin{bmatrix} Vx \\ Vy \\ Vz \end{bmatrix} = \begin{bmatrix} P11 & P12 & P13 \\ P21 & P22 & P23 \\ P31 & P32 & P33 \end{bmatrix} \begin{bmatrix} Ax \\ Ay \\ Az \end{bmatrix}$$

where Vx, Vy and Vz are readings of voltage meters 61, 62 and 63, respectively, and Ax, Ay and Az are component values in respective directions of a force (acceleration or magnetism) actually exerted. Further, P11 to P33 are coefficients constituting the characteristic matrix. This determinant can be rewritten as follows.

$$\begin{bmatrix} Ax \\ Ay \\ Az \end{bmatrix} = \begin{bmatrix} P11 & P12 & P13 \\ P21 & P22 & P23 \\ P31 & P32 & P33 \end{bmatrix}^{-1} \begin{bmatrix} Vx \\ Vy \\ Vz \end{bmatrix}$$

$$= \begin{bmatrix} K11 & K12 & K13 \\ K21 & K22 & K23 \\ K31 & K32 & K33 \end{bmatrix} \begin{bmatrix} Vx \\ Vy \\ Vz \end{bmatrix}$$

Here, the matrix using coefficients K11 to K33 is an inverse matrix of the matrix using coefficients P11 to P33. This determinant is written by a general expression as follows:

$Ax = K11Vx + K12Vy + K13Vz$ $Ay = K21Vx + K22Vy + K23Vz$ $Az = K31Vx + K32Vy + K33Vz$

Accordingly, when the above described operation using coefficients K11 to K33 is performed with respect to voltage values Vx, Vy and Vz -obtained at voltage meters 61 to 63, correct detected values Ax, Ay and Az free from interference can be provided.

2.2 Actual Circuit Configuration

The signal processing circuit of this invention is constructed to perform this operation by an analog circuit. This circuit is shown, in a block form, in FIG. 11. Here, Vx, Vy and Vz are analog voltages obtained at voltage meters 61 to 63, respectively. Blocks 101 to 109 labeled coefficients K11 to K33 are analog multipliers for multiplying respective coefficient values, and blocks 111 to 113 indicated by + sign are analog adders. When a circuit of such a configuration is used, correct detected values Ax, Ay and Az are provided as output voltages of the adders 111 to 113. This is readily understood from the fact that this circuit corresponds to the above describe operational equation.

The circuit with respect to the three dimensional detector has been described as above. With respect to the two dimensional detector, it is sufficient that the operation expressed below can be performed:

$Ax = K11Vx + K12Vy$ $Ay = K21Vx + K22Vy$

Figure 12:
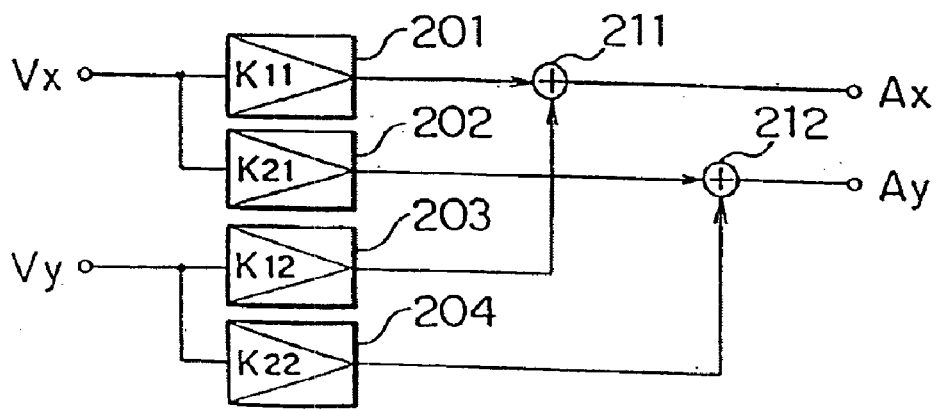
FIG. 12 is a block diagram of a signal processing circuit for another acceleration detector according to this invention.

Accordingly, a circuit shown, in a block form, in FIG. 12 may be used for this purpose. Blocks 201 to 204 are analog multipliers for multiplying respective coefficient values, and correct detected values Ax and Ay are provided as output voltages from adders 211 and 212.

It is to be noted that nine coefficients are used in the case of the three dimensional detector, and four coefficients are used in the two dimensional detector. In the case where the coefficient values are zero, any multiplier therefor becomes unnecessary.

Figure 11:
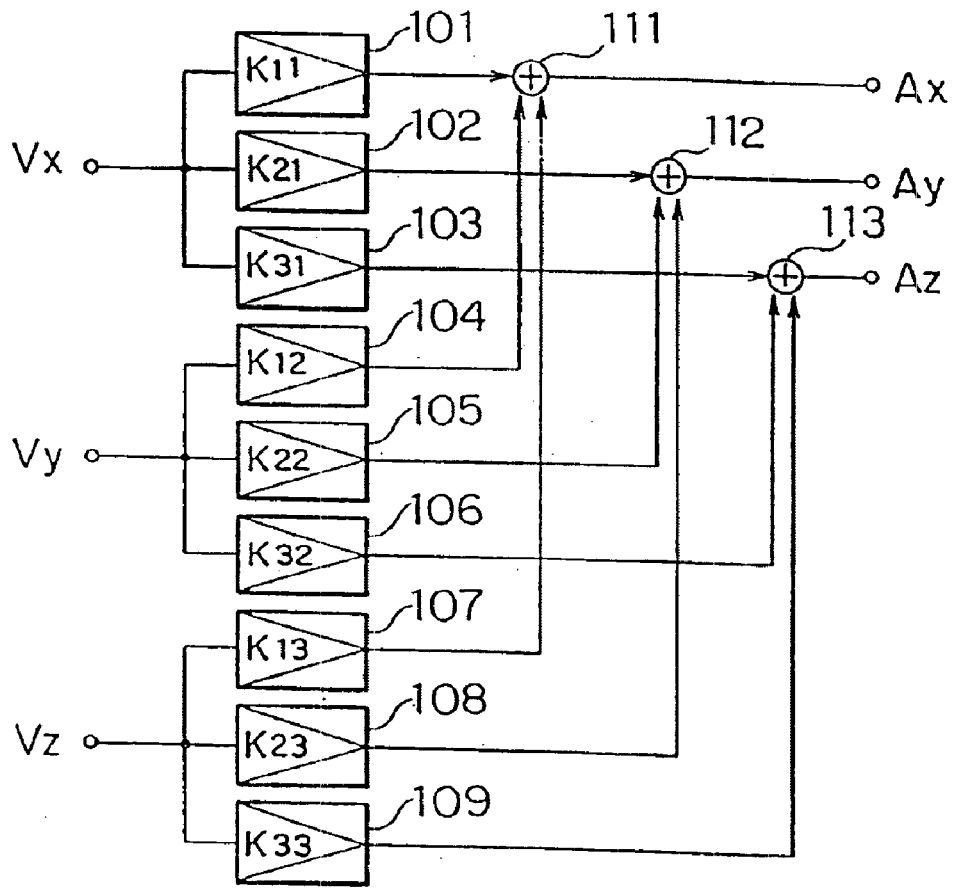
FIG. 11 is a block diagram of a signal processing circuit for an acceleration detector according to this invention.

An example of the actual circuit configuration of the multiplier and the adder shown, in a block form, in FIGS. 11 and 12 will now be described. FIG; 13 is a circuit diagram showing an example of the configuration of the multiplier. When a voltage Vin is applied to the input side of the operational amplifier OP1, a voltage Vout is provided on the output side. Here, when it is assumed that R3 is expressed as R3=R1//R2 (// indicates the resistance value when two resistors are connected in parallel), the following relationship holds:

$Vout = -(R2/R1) \cdot Vin$

Figure 14:
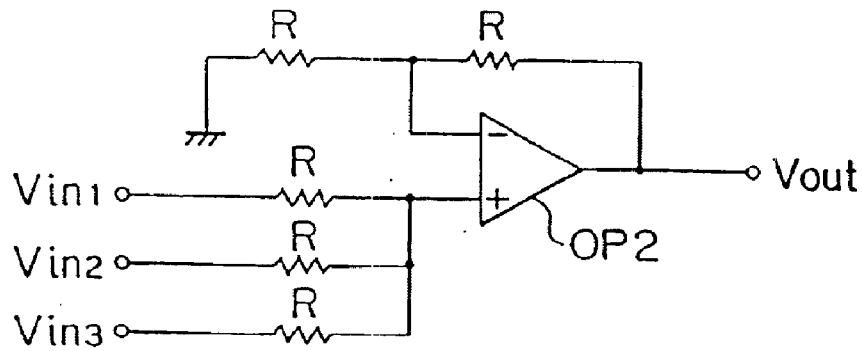
FIG. 14 is an actual circuit diagram of an adder used in the signal processing circuit of this invention.

Accordingly, this operational amplifier functions as a multiplier for multiplying coefficient -(R2/R1). On the other hand, FIG. 14 is a circuit diagram showing an example of the configuration of the adder. It is sufficient to use resistors R all having the same resistance value. When voltages Vin1, Vin2 and Vin3 are applied to the input side of the operational amplifier OP2, a voltage Vout is provided on the output side. Here, the voltage Vout is expressed as follows:

$Vout = (Vin1 + Vin2 + Vin3) \cdot \frac{2}{3}$

Figure 15:
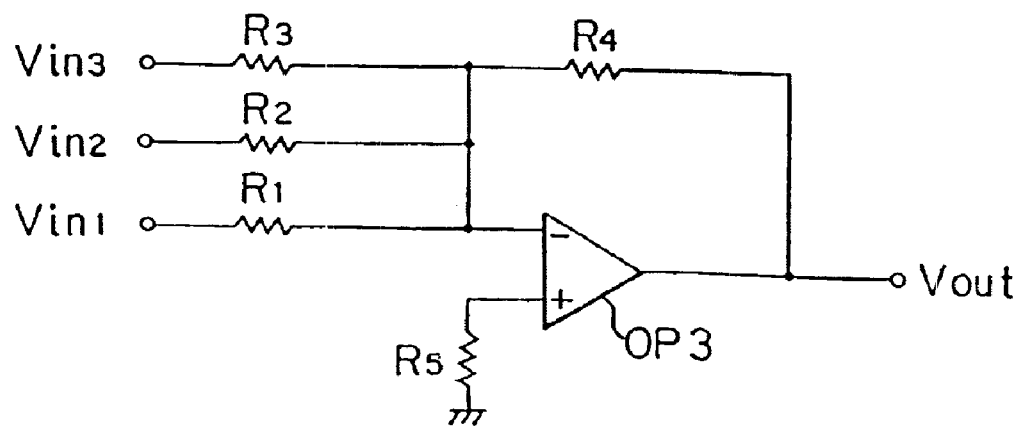
FIG. 15 is a circuit diagram of an actual circuit both serving as a multiplier and an adder used in the signal processing circuit of this invention.

Accordingly, addition of an input voltage can be carried out. A circuit having both the multiplier and the adder is shown in FIG. 15. When voltages Vin1, Vin2 and Vin3 are applied to the input side of the operational amplifier OP3, a voltage Vout is provided on the output side. Here, Vout is expressed as follows:

$$Vout = -((R4/R1) \cdot Vin1 +$$

$$(R4/R2) \cdot Vin2 +$$

$$(R4/R3) \cdot Vin3)$$

Namely, this circuit performs a function doubling as a multiplier and an adder.

Figure 13:
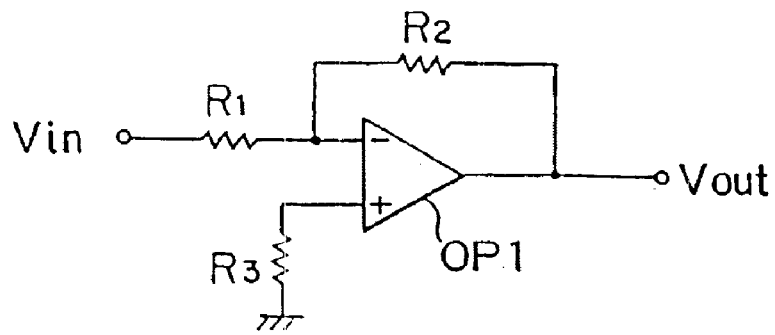
FIG. 13 is an actual circuit diagram of a multiplier used in the signal processing circuit of this invention.
Figure 16:
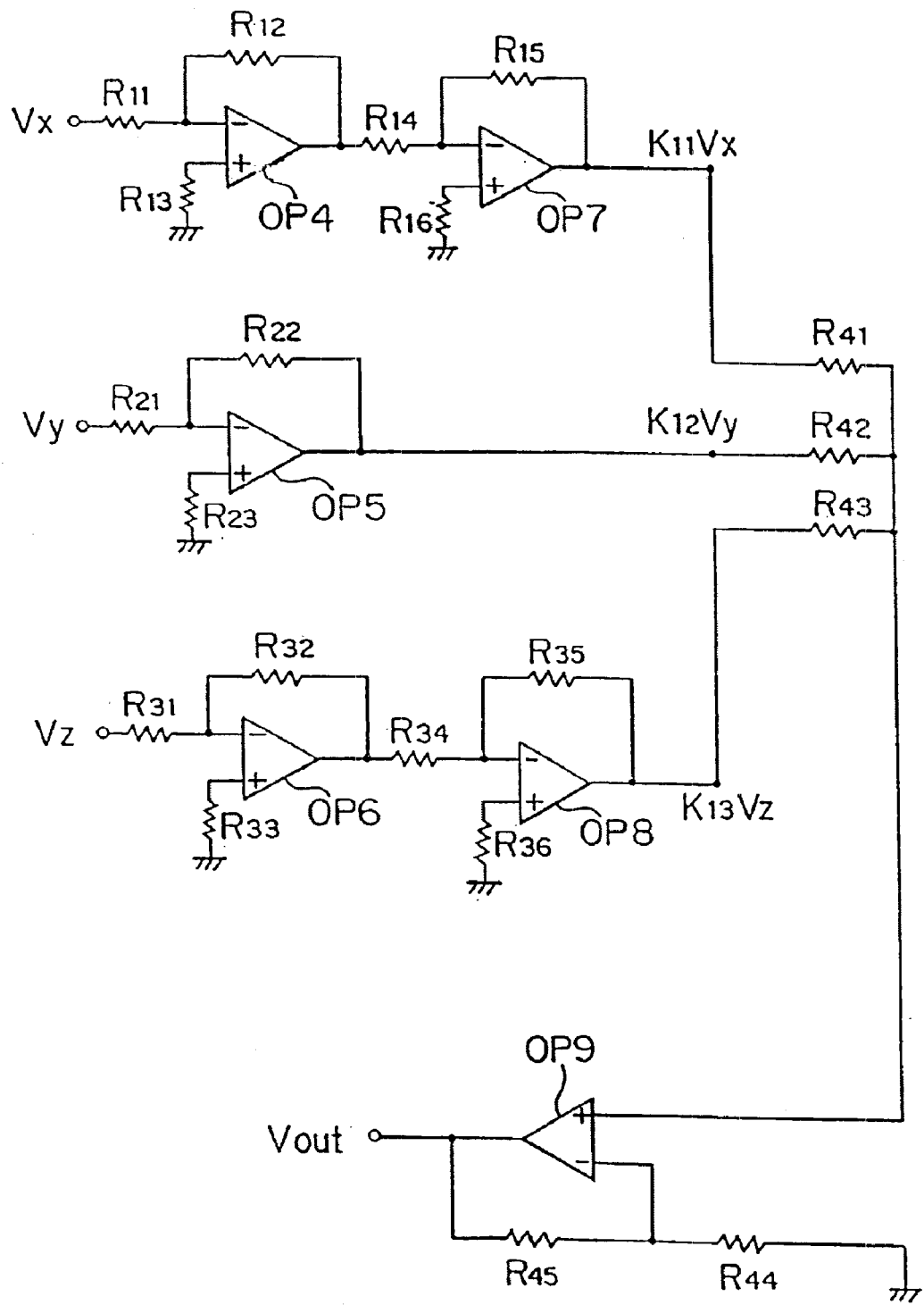
FIG. 16 is an actual partial circuit diagram of a signal processing circuit for an acceleration detector according to this invention.

FIG. 16 is a diagram showing an actual circuit for performing an operation expressed below by using the multiplier shown in FIG. 13 and the adder shown in FIG. 14:

$$Ax = (K11Vx + K12Vy + K13Vz) \cdot \tfrac{2}{3}$$

Here, an example of the circuit configuration in the case of K11>0, K12<0 and K13>0 is shown. Voltages Vx, Vy and Vz are voltages when voltages appearing on the voltage meters 61 to 63 of FIGS. 6a to 6c are applied as they are, respectively. These voltages are amplified by the operational amplifiers OP4, OP5 and OP6 so that they are equal to values −K11 times, −K12 times and −K13 times larger than Vx, Vy and Vz, respectively. To realize this, it is sufficient that it is assumed that the relationships expressed as |R13|=R11//R12, |R23|=R21//R22, and |R33|=R31//R32 hold, and that respective resistance values are set so that |K11|=R12/R11, |K12|=R22/R21 and |K13|=R32/R31 hold. By this amplifying operation, sign is inverted. With respect to Vy, since K12<0, it is sufficient that the sign remains in an inverted state. In contrast, with respect to Vx and Vz, since K11>0 and K13>0, it is necessary to invert the sign for a second time to convert the sign to the original one for a second time. In view of this, by operational amplifiers OP7 and OP8, inversion of sign is carried out. Assuming now that R14=R15=2·R16 and R34=R35=2·R36 hold, the amplification factors of the operational amplifiers OP7 and OP8 are equal to 1 to serve as a function to merely invert the sign. Thus, respective values of K11Vx, K12Vy and K13Vz are determined, and voltages corresponding to these values are applied to the operational amplifier OP9. Here, when it is assumed that R41=R42=R43=R44=R45 holds, the operational amplifier OP9 functions as an adder. Thus, an output voltage Vout expressed below is outputted:

$$Vout = (K11Vx + K12Vy + K13Vz) \cdot \tfrac{2}{3}$$

This output voltage Vout corresponds to a detected value Ax to be determined.

2.3 Other Embodiments

An example of the signal processing circuit for force detector according to this invention has been described with reference to fig. 16. In addition, this invention can be realized by using various circuits. As the multiplier and the adder in this invention, any circuit capable of effecting multiplication and addition by analog processing may be used. Further, it is not necessary to constitute the multiplier and the adder with separate circuit elements, respectively. For example, if a circuit as shown in FIG. 15 is used, a single operational amplifier OP3 can serve as both the multiplier and the adder. This is advantageous in that the number of parts can be reduced. It is to be noted that, in the case of utilizing this circuit, it is necessary to allow input voltages Vin1, Vin2 and Vin3 to have sign in consideration of the sign of the coefficient K. Further, an approach may be employed to provide three resistors to connect them in a Y form such that their one ends are commonly connected to apply voltages to respective the other ends, thus to take out an output from the common terminal. Anyway, in the case where an approach is employed to perform corrective operation by such an analog circuit, the cost can be lower than that in the case where corrective operation is carried out by the digital circuit, and the operation is completed at a speed higher than that in the latter case. Accordingly, this is advantageous in the case where there is such a necessity to measure a momentary phenomenon. Particularly, in the case of the acceleration detector, there is such a use to detect shock at the time of collision. If this invention is applied to such a use, a correct measured value can be momentarily obtained. As stated above, the signal processing circuit according to this invention can be widely applied mainly to a force detector, and further to an acceleration detector or a magnetic detector, etc. While the acceleration detector has been described in the embodiment of this application, this invention can be widely applied to a force detector or a magnetic detector.

2.4 Advantages with this Processing Circuit

As described above, in accordance with a processing circuit for an acceleration detector of this invention, an approach is employed to determine in advance an inverse matrix of the characteristic matrix showing how interference produced between components in respective axial directions is to carry out corrective operation using this inverse matrix by the analog operation circuit, thus making it possible to momentarily provide correct measured values in which the influence of interference is canceled by using a low cost circuit.

§3 Test of the Sensor 3.1 Principle of a Test Method According to this Invention The method of mass producing acceleration sensors as shown in the previously described §1 is disclosed in the specification of the U.S. application Ser. No. 526837 (European Patent Application No. 90110066.9). Prior to shipping or forwarding such sensors as the products, it is necessary to conduct a test as to whether or not there is any problem in the function as the acceleration sensor. As this test method, an approach may be employed to give vibration to this acceleration sensor by means of a vibration generator to check an output from the sensor at this time to thereby conduct a test. However, as previously described, the testing apparatus becomes large and only a dynamic characteristic can be provided. Particularly, since this sensor can detect an acceleration in all directions of X, Y and Z in the three dimensional coordinate system, it is necessary to give vibration in consideration of directions of three dimensions. As a result, the testing apparatus becomes considerably complicated.

Figure 17:
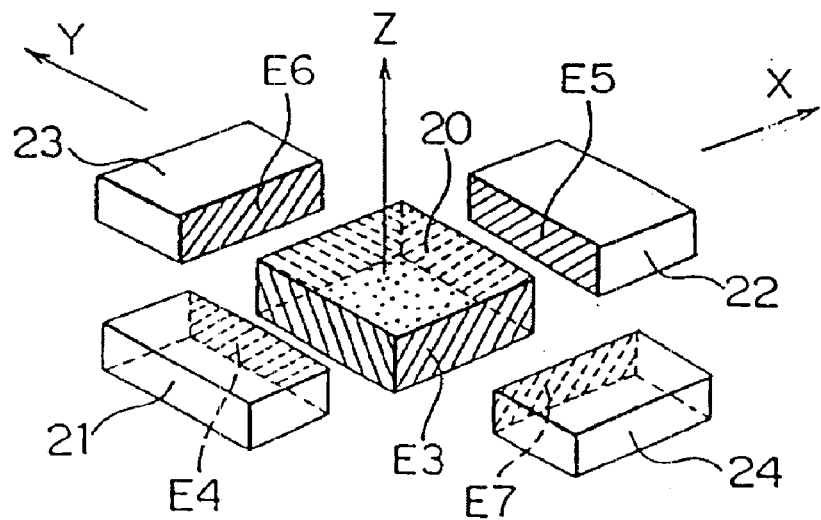
FIG. 17 is a perspective view showing the state where an electrode layer is formed on the weight body and the pedestal of the sensor of FIG. 1.
Figure 18:
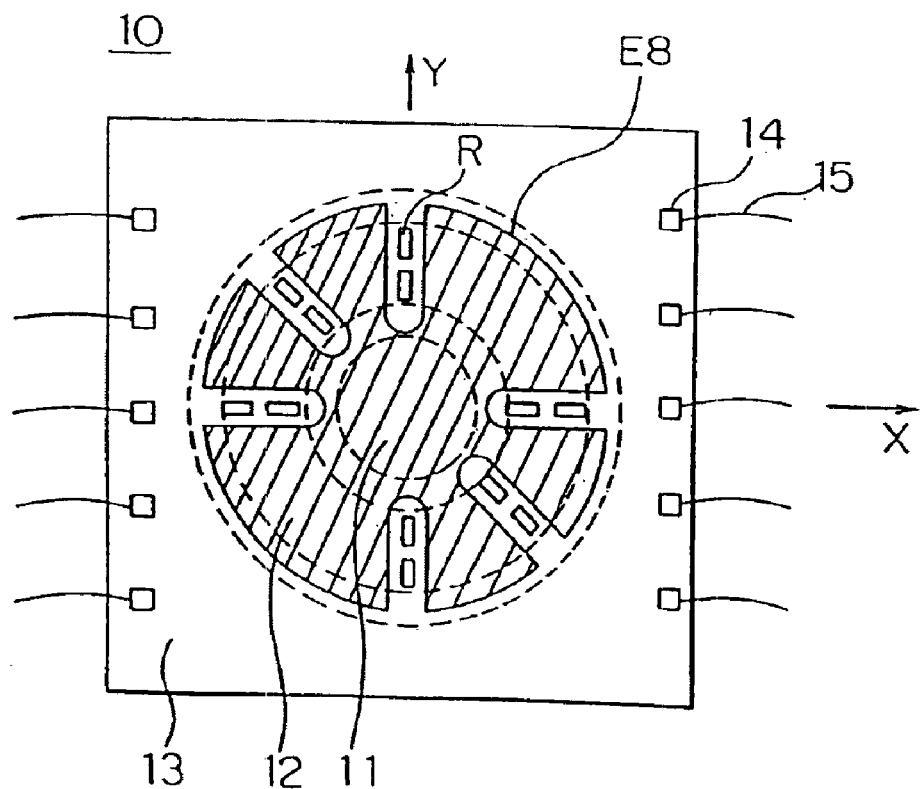
FIG. 18 is a top view showing the state where an electrode layer is formed on the semiconductor pellet of the sensor of FIG. 1.
Figure 19:
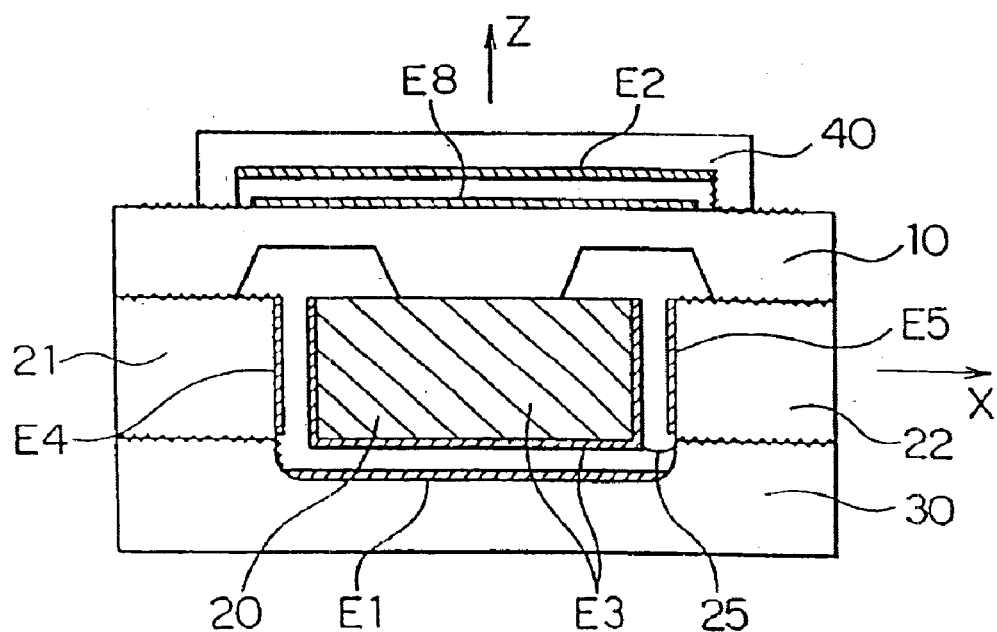
FIG. 19 is a cross sectional view showing the state where electrode layers are formed on respective portions of the center portion of the sensor of FIG. 1, FIGS. 20 to 22 are cross sectional views showing displacement states of the center portion of the sensor of FIG. 1, respectively.

In accordance with the testing method according to this invention, the sensor can be placed in the same environment where an acceleration is exerted without actually applying acceleration to the sensor. The basic principle is as follows. Initially, several electrode layers are formed at predetermined portions within the sensor. For this electrode layer, any layer comprised of a conductive material may be used. Actually, it is sufficient to form thin layers in metal such as aluminum at predetermined portions by vacuum deposition or sputtering. In this case, it is preferable to coat the upper surface of the aluminum with $SiO_2$ film or SiN film for protection of the surface. The electrode layers are formed at respective portions as described below. Initially, as shown in FIG. 4, an electrode layer E1 (indicated by hatching in the figure) is formed within the groove 31 provided in the control member 30, and, as shown in FIG. 5, an electrode layer E2 (indicated by hatching in the figure) is formed in the groove 41 provided in the control member 40. Further, as shown in FIG. 17, an electrode layer E3 (indicated by hatching in the figure: although formed over five surfaces, this layer is a single electrode layer electrically conductive) is formed on the entire side surfaces and the bottom surface of the weight body 20, and electrode layers E4 to E7 (indicated by hatching in the figure) are formed on respective inside surfaces of pedestals 21 to 24, respectively. Further on the upper surface of the semiconductor pellet 10, as shown in FIG. 18, an electrode layer E8 (indicated by hatching) is formed so as to avoid resistance elements R. In this way, in FIGS. 4, 5, 17 and 18, electrode layers are formed in the hatched areas, respectively. As a result, the cross sectional view of the sensor center portion within the package is as shown in FIG. 19 (In FIG. 19, the hatched portions indicate electrode layers, and hatchings indicating the cross section is omitted because the figure becomes intricate). By FIG. 19, the relative positional relationship of respective electrode layers E1 to E8 can be understood. The wave lines in FIG. 19 indicate wirings with respect to respective electrode layers. Such wirings can be connected to the lead 52 for external wiring (refer to FIG. 1) outside the package by means of bonding wire. In addition, wiring is implemented to the electrode layer E3 formed on the weight body 20 by means of bonding wires 25.

The feature of the respective electrode layers E1 to E8 formed in this way is that they are formed at opposite positions every paired electrode layers, respectively. Namely, as, shown in FIG. 19, E2:E8, E3:E4, E3:E5, E3:E6, E3:E7, E3:E1 are formed at positions opposite to each other (five surfaces of the electrode layer E3 are opposite to different electrode layers, respectively). When voltages are applied to electrodes opposite in this way, respectively, coloumb forces are exerted between the respective both electrode layers. Namely, when voltages of the same polarity are applied to the both electrode layers, a repulsive force is exerted, while when voltages of different polarities are applied thereto, an attractive force is exerted. When a voltage is now assumed to be applied so that a repulsive force is exerted between E3 and E4 and an attractive force is exerted between E3 and E5, there takes place the same phenomenon as that where a force in the X direction is exerted on the weight body 20. In other words, this sensor can be placed under the same environment as that where an acceleration in the −X direction is exerted on the sensor body (when an acceleration is exerted on the sensor body, an inertia force in a direction opposite to the above is exerted on the weight body). Under this environment, whether or not an output corresponding to changes in the resistance values of the resistance elements, which indicates an acceleration in the −X direction, is detected is examined, thereby making it possible to conduct a test with respect to the acceleration in the −X direction. If an attractive force and a repulsive force are exerted in an opposite manner, a test with respect to the acceleration in the +X direction can be conducted. Exactly in the same manner, if voltages are applied so that an attractive force is exerted between E3 and E6, and a repulsive force is exerted between E3 and E7, a test with respect to the acceleration in the Y direction (upper direction perpendicular to plane surface of paper of FIG. 19) can be conducted. If an attractive force and a repulsive force are exerted in an opposite manner, a test with respect to the acceleration in the +Y direction (lower direction perpendicular to plane surface of paper of FIG. 19) can be conducted. Further, if voltages are applied so that an attractive force is exerted between E2 and E8, and a repulsive force is exerted between E3 and E1, a test with respect to the acceleration in the −Z direction can be conducted. If an attractive force and a repulsive force are exerted in an opposite manner, a test with respect to the acceleration in the +Z direction can be conducted. As previously described, since respective electrode layers and respective resistance elements for detection of acceleration are both electrically connected to leads 52 (refer to FIG. 1) outside the package by means of bonding wires, the above described test can be conducted by an operation to only monitor an acceleration detected signal outputted from a predetermined lead terminal while simply applying a predetermined voltage to the predetermined lead terminal. As stated above, in accordance with the testing method according to this invention, it is possible to carry out an acceleration detecting test with respect to all directions of three dimensions extremely with ease.

3.2 More Practical Embodiment

Figure 20:
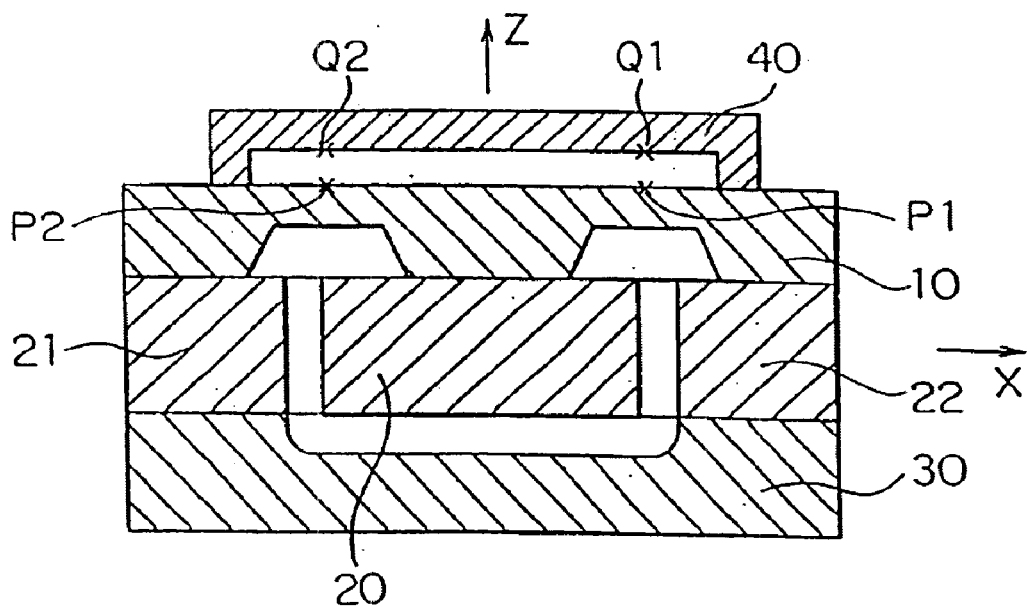
Figure 21:
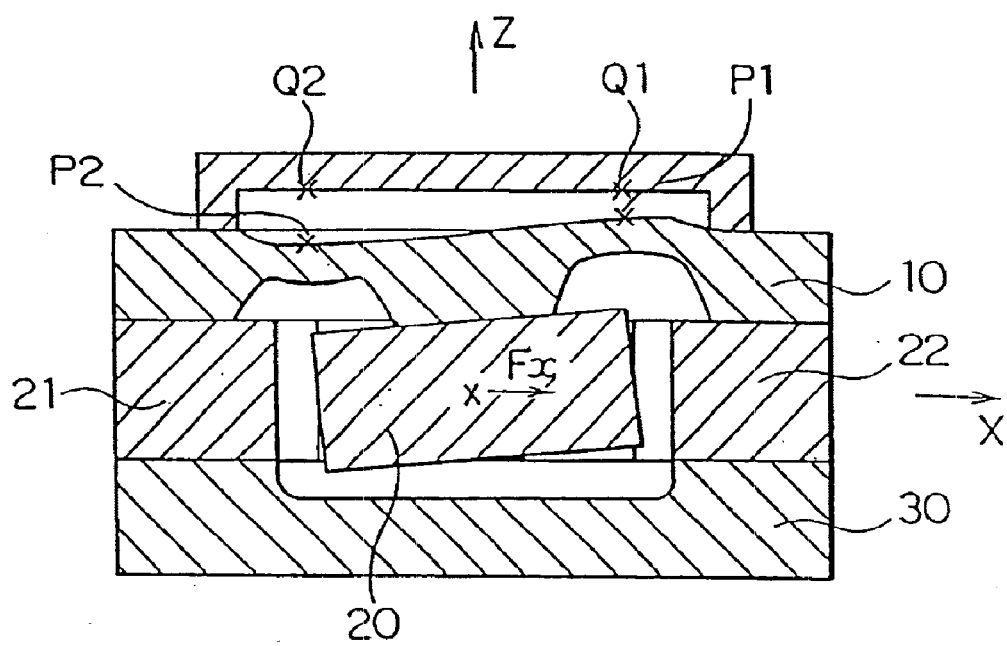
Figure 22:
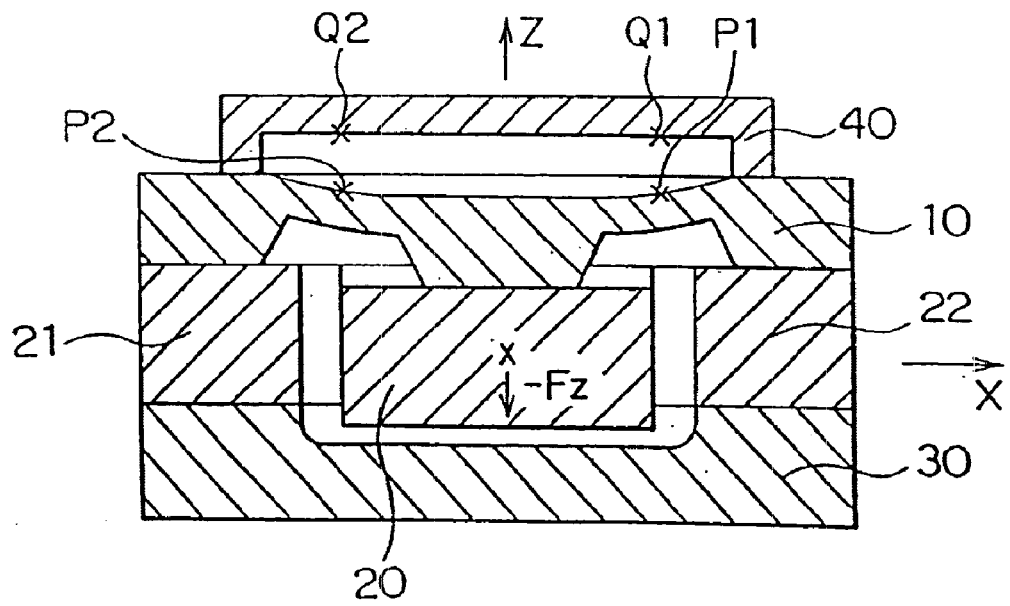

With respect to embodiment shown in FIG. 19, it is necessary to form electrode layers at considerably large number of portions. Accordingly, this embodiment is not so practical. It is preferable to carry out an acceleration detecting test with respect to all directions of three dimensions by electrode layers provided at necessary and minimum portions if possible. Let now suppose the following model. FIG. 20 is a cross sectional view of the center portion of the acceleration sensor. Points P1 and P2 are taken at two portions on the semiconductor pellet 10, and points Q1 and Q2 are taken at two portions inside the control member 40. In this case, the points P1 and Q1 are opposite to each other, and the points P2 and Q2 are opposite to each other. When it is now assumed that an attractive force is exerted between the points P1 and Q1, and a repulsive force is exerted between the points P2 and Q2, the points P1 and P2 are subjected to displacement relative to the points Q1 and Q2. As a result, as shown in FIG. 21, the semiconductor pellet 10 produces a mechanical deformation. This state is the same state where a force Fx in the +X direction is exerted on the weight body 20. In other words, this state is the same state where an acceleration in the −X direction is exerted on the sensor body. Further, if an attractive force and a repulsive force are exerted in an opposite manner, there results the same state as the state where an acceleration in the +X direction is exerted. Thus, it is seen that if electrode layers are formed at predetermined portions on the upper surface of the semiconductor pellet 10 and at predetermined portions on the lower surface of the control member 40, an acceleration detecting test in the ±X direction can be conducted. An acceleration detecting test in the ±Y direction can be similarly carried out by varying the positions of electrode layers by an angle of 90 degrees. When a repulsive force is exerted between the points P1 and Q1 and a repulsive force is also exerted between the points P2 and Q2, there results the same state as the state where a force Fz in the Z direction is exerted on the weight body 20 as shown in FIG. 22. In other words, there results the same state as the state where an acceleration in the +Z direction is exerted on the sensor body. Further, if an attractive force is exerted both between the points P1 and Q1 and between the points P2 and Q2, there results the same state as the state where an acceleration in the −Z direction is exerted. Thus, it is seen that electrode layers are formed at predetermined portions on the upper surface of the semiconductor pellet 10 and at predetermined portions on the lower surface of the control member 40, thereby making it possible to conduct an acceleration detecting test in the ±Z direction.

Figure 23:
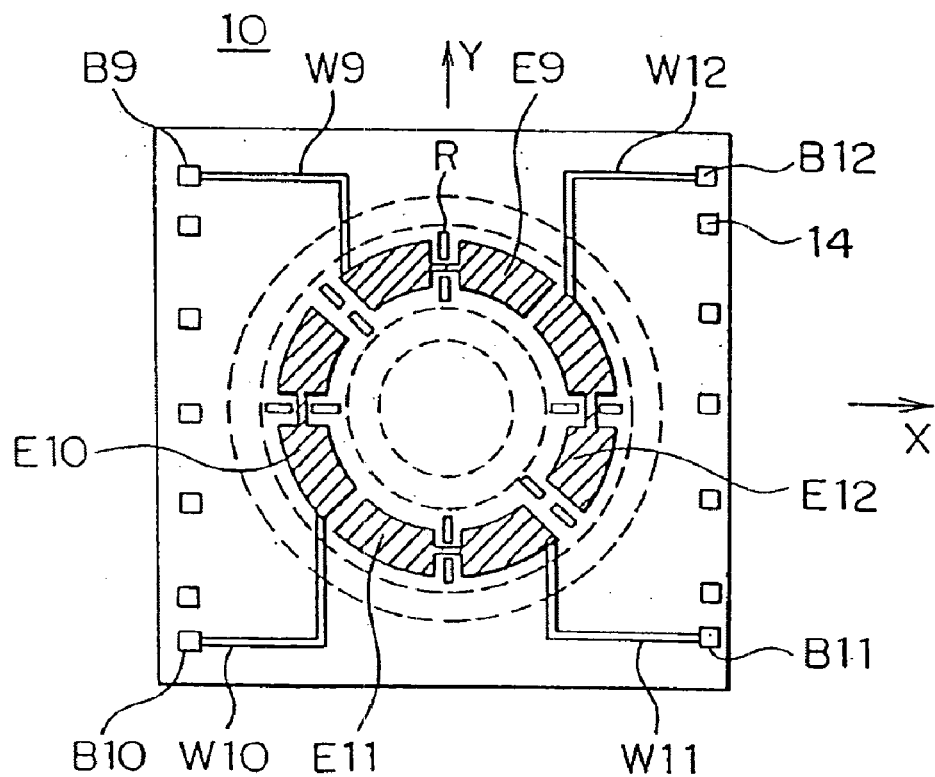
FIG. 23 is a top view showing the state where practical electrode layers are formed on the semiconductor pellet of the sensor of FIG. 1.
Figure 24:
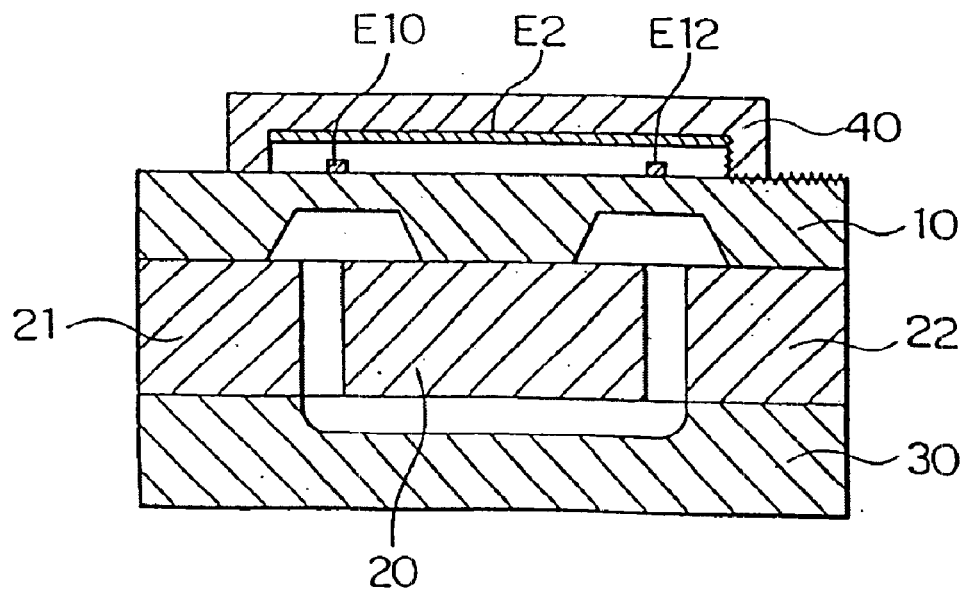
FIG. 24 is a cross sectional view showing the state where practical electrode layers are formed at predetermined portions.

As stated above, eventually, if electrode layers are formed at predetermined portions on the upper surface of the semiconductor pellet 10 and at predetermined portions on the lower surface of the control member 40, it is possible to carry out an acceleration detecting test with respect to all directions of three dimensions. A further practical example of the electrode layer arrangement will now be described. Initially, on the upper surface of the semiconductor pellet 10, as indicated by hatching (which does not indicate the cross section) in FIG. 23, four electrode layers E9 to E12 are formed. Respective electrode layers are formed so as to avoid the areas where resistor elements R are formed, and are connected to bonding pads B9 to B12 by means of wiring layers W9 to W12, respectively. Bonding wires (not shown) are connected to bonding pads B9 to B12, and electrical connections with respect to leads outside the package are finally implemented. Although not shown in FIG. 23, the resistance elements R are also connected to the bonding pads 14, respectively, and are electrically connected to leads outside the package. On the semiconductor pellet 10, wiring layers such as aluminum, etc. are formed in order to carry out wirings with respect to resistance elements R. In this case, for forming electrode layers E9 to E12 or wiring layers W9 to W12, it is preferable to use the same mask as that for the wiring layers such as aluminum, etc. Thus, by only adding the work for altering the conventional mask pattern, it is possible to form additional electrode layers E9 to E12 or wiring layers W9 to W12 for test. Of course, electrode layers E9 to E12 or wiring layers W9 to W12 may be formed as a diffused layer by making use of the diffusion process for forming gauge resistors, etc. The manufacturing process for the semiconductor pellet 10 can employ exactly the same process as that of the prior art. On the other hand, the electrode layer E2 shown in FIG. 5 may be formed on the lower surface of the control member 40. This may be accomplished by allowing aluminum, etc. to adhere on the surface by vacuum deposition or sputtering. While the electrode layer E2 shown in FIG. 5 is formed as a physically single electrode layer, an approach may be of course employed to allow this electrode layer E2 to be comprised of physically plural electrodes to electrically connect these electrodes so that they have the same potential, thus to constitute this electrode layer with "electrode layer which is divided into a plurality of electrode sections from a physical point of view, but is formed as a single electrode layer from an electric point of view". The cross sectional view when electrode layers as described above are formed is shown in FIG. 24. Wiring indicated by the wave lines in the figure is implemented to the electrode layer E2, and is further connected to external leads. In this way, a single electrode layer E2 is formed as one electrode layer, and four subelectrode layers E9 to E12 are formed as the other electrode layers opposite to the single electrode layer.

To conduct a test for such an acceleration sensor, by employing the following approach under the state where a voltage of +V is applied to the electrode layer E2, an acceleration detecting test with respect to all directions of three dimensions can be conducted.

(1) If +V and −V are applied to E10 and E12, respectively, a force +Fx can be exerted on the weight body 20. Thus, an acceleration detecting test in the −X direction can be carried out.

(2) If −V and +V are applied to E10 and E12, respectively, a force −Fx can be exerted on the weigh body 20. Thus, an acceleration detecting test in the +X direction can be carried out.

(3) If +V and −V are applied to E11 and E9, respectively, a force +Fy can be exerted on the weight body 20. Thus, an acceleration detecting test in the −Y direction can be carried out.

(4) If −V and +V are applied to E11 and E9, respectively, a force −Fy can be exerted on the weight body 20. Thus, an acceleration detecting test in the +Y direction can be carried out.

(5) If −V is applied to each of E9 to E12, a force +Fz can be exerted on the weight body 20. Thus, an acceleration detecting test in the −Z direction can be carried out.

(6) If +V is applied to each of E9 to E12, a force −Fz can be exerted on the weight body 20. Thus, an acceleration detecting test in the +Z direction can be carried out.

While the acceleration detecting test on the X, Y and. Z axes has been described above, the detecting test for an acceleration in a direction not on the X, y and Z axes may be also carried out by applying predetermined voltages to the electrode layers E9 to E12, respectively.

It is to be noted that applied voltages +V and −V should be set to a voltage value such that changes in the resistance values of the resistor elements R can be sufficiently detected. This value depends upon the thickness and the diameter of the flexible portion 12 forming an annular diaphragm.

3.3 Other Embodiments

Figure 25:
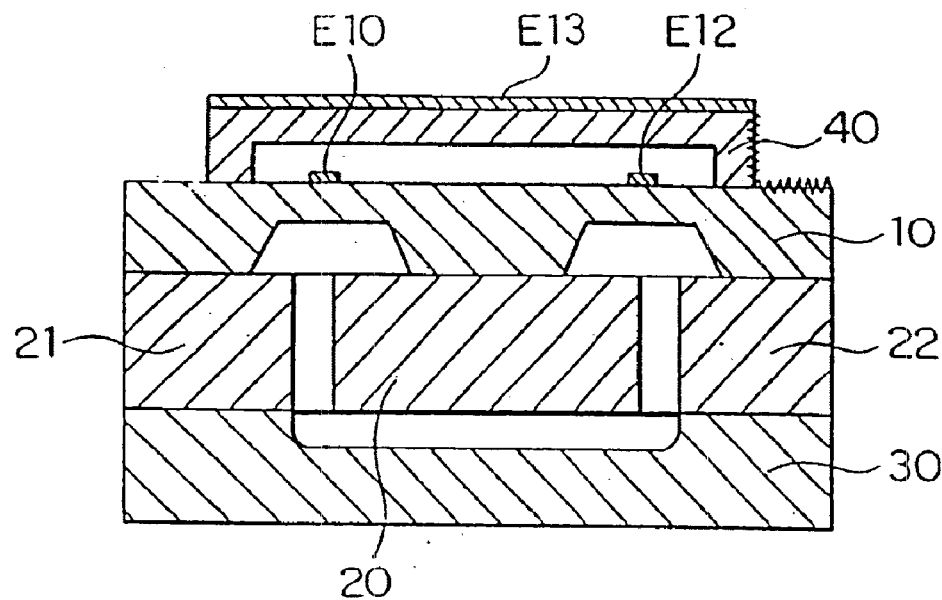
FIG. 25 is a cross sectional view showing the state where electrode layers according to a different embodiment are formed at predetermined portions of the center portion of the sensor of FIG. 1.

The above-described embodiment should be considered to be one mode of this invention. In addition to this, various embodiments are conceivable. Several ones thereof will be described below. In the embodiment in which the cross section is shown in FIG. 25, an electrode layer E13 is formed in place of the electrode layer E2. Since the electrode layer E13 is formed on the upper surface of the control member 40, wiring to the external is facilitated. It is to be noted that a coulomb force exerted between electrodes becomes weaker to some extent than that of the previously described embodiment.

Figure 26:
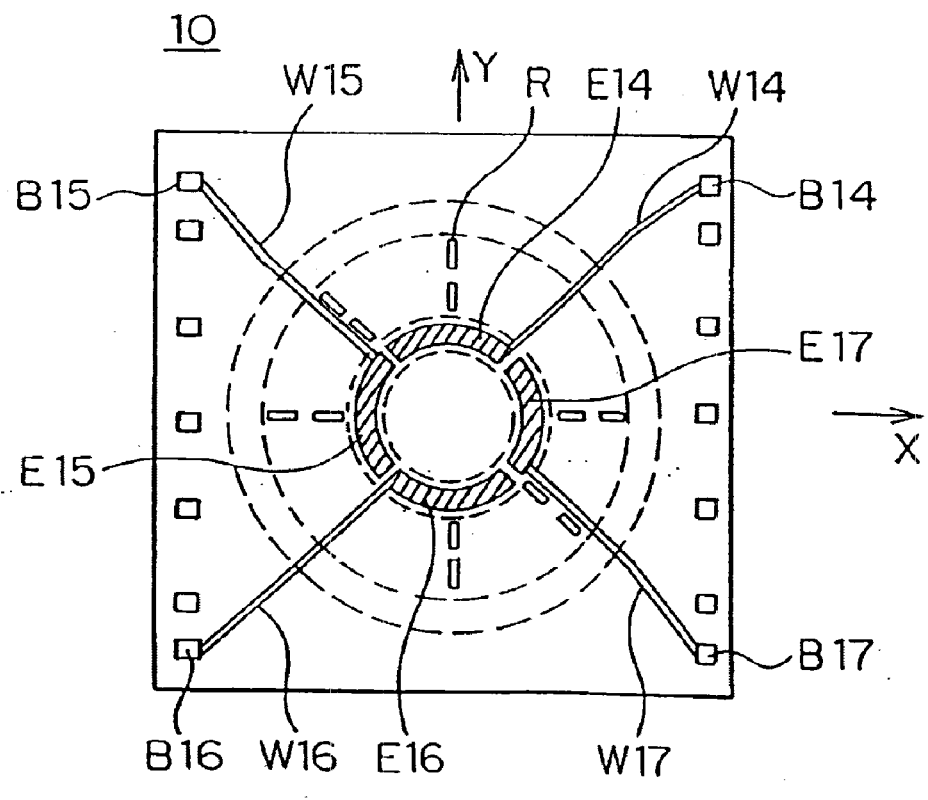
FIG. 26 is a top view showing the state where electrode layers according to a further different embodiment are formed on the semiconductor pellet of the sensor of FIG. 1.

In the embodiment shown in FIG. 26, electrode layers E14 to E17 (indicated by hatching) are formed in place of the electrode layers E9 to E12 of the above-described embodiment, and wiring layers W14 to W17 and bonding pads B14 to B17 for the electrode layers. E14 to E17 are formed. Such an arrangement is advantageous in that there is little possibility that wiring layers give obstruction to wirings for resistance elements R. However, since electrode layers are arranged inside of the position where the semiconductor pellet 10 has the greatest flexibility, and the area of the electrode is reduced, the acting efficiency of force is lowered.

Figure 27:
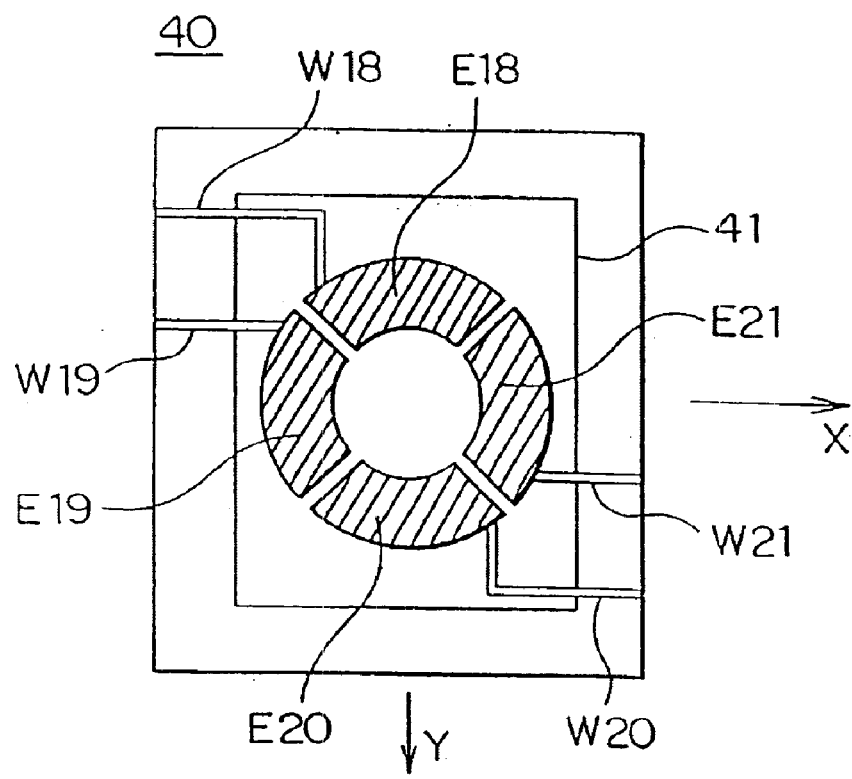
FIG. 27 is a bottom view showing the state where electrode layers according to a different embodiment are formed on the upper part control member of the sensor of FIG. 1.
Figure 28:
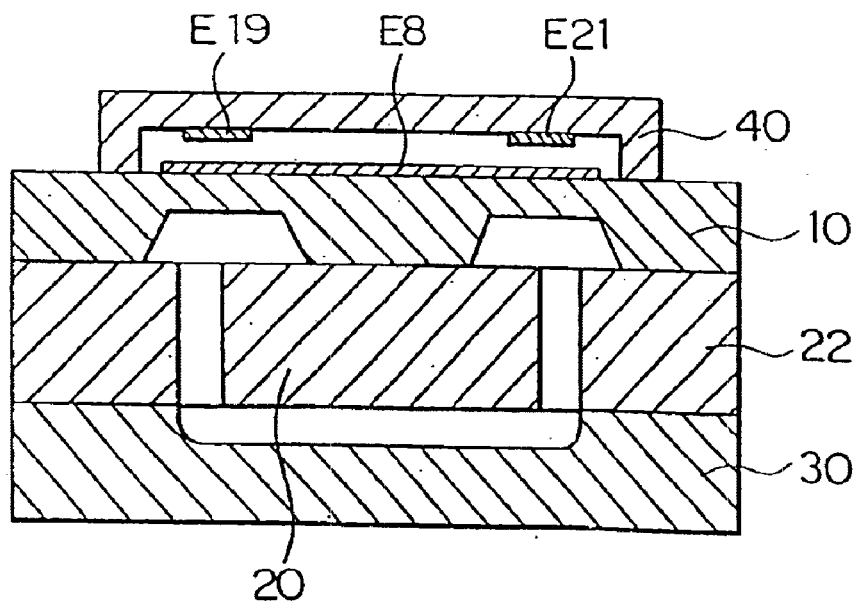
FIG. 28 is a cross sectional view showing the state where electrode layers according to a further different embodiment are formed at predetermined portions of the center portion of the sensor of FIG. 1.

In the embodiment shown in FIGS. 27 and 28, the arrangement relationship in a longitudinal direction of electrode layers is opposite to that of the previously described embodiment. Namely, four electrode layers E18 to E21 (indicated by hatching) and wiring layers W18 to W21 therefor are formed within a groove 41 on the lower surface of the control member 40. As the electrode opposite thereto, e.g., a single electrode E8 formed on the semiconductor pellet 10 as shown in FIG. 18 may be employed.

Figure 29:
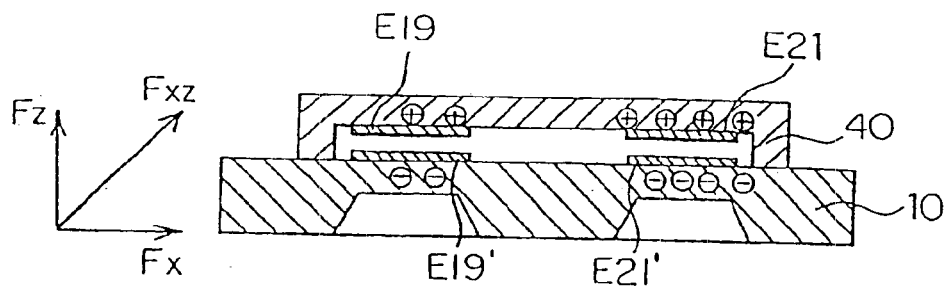
FIG. 29 is a cross sectional view showing the state where electrode layers according to a still further different embodiment are formed at predetermined portions of the center portion of the sensor of FIG. 1.

In the embodiment shown in FIG. 29, four electrode layers E18' to E21' are formed in place of the electrode layer E8 of the embodiment shown in FIG. 28. These electrode layers E18' to E21' are symmetrical to electrodes E18 to E21, and four sets of electrode pairs opposite in a longitudinal direction are formed. If four sets of (eight in total) are all caused to be electrically independent, various voltages are applied to these electrodes, thereby making it possible to conduct a test with respect to various directions. For example, as shown in FIG. 29, if charges "++" and "−−" are given to electrodes E19 and E19', respectively, and, at the same time, charges "++++" and "−−−−" are given to electrodes E21 and E21', respectively (the number of + or − indicates the quantity of charges), while an attractive force is between all upper and lower electrode pairs, since an attractive force between electrode pairs on the right side in the figure becomes large, a test in the same state as the state where Fxz (resultant force of Fx and Fz) in a direction as shown in the figure is exerted can be conducted.

In addition, various embodiments are conceivable. In short, as long as there is employed an arrangement adapted to permit a coulomb force to be exerted between a first portion to produce a displacement by the action of a force and a second portion present at the position opposite to the first portion, any arrangement may be employed in this invention.

While the above described embodiments are all directed to the acceleration sensor, this invention can be applied, exactly in the same manner, to a magnetic sensor using a magnetic body in place of a weight body, or to a force sensor. Further, this invention is applicable not only to a three dimensional sensor, but also to a two dimensional or one dimensional sensor. For example, in the case of a two dimensional sensor for detecting acceleration or magnetism in the X and Z-axes, or a one dimensional sensor for detecting acceleration or magnetism in the X-axis direction, it is sufficient to provide only two electrodes of E10 and E12 of four electrodes E9 to E12 shown in FIG. 23.

3.4 Method of Applying Voltage

Figure 30A:
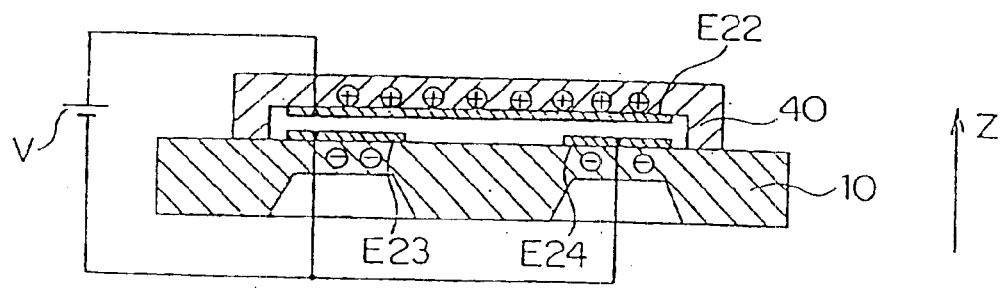
FIG. 30a is a model view showing a method of applying voltage in order to realize the same state as the state where a force in a Z direction is exerted on the weight body of the sensor shown in FIG. 1.

Finally, an example of a method of applying a voltage for carrying out this testing method is shown. FIG. 30a is a model view showing a method of applying a voltage for realizing the same state as the state where a force in a Z direction is exerted on a weight body (not shown). Electrode E22 on the control unit 40 side and electrodes E23 and E24 on the semiconductor pellet 10 side are caused to produce charges of polarities opposite to each other by means of power supply V, thus allowing an attractive force to be exerted therebetween.

Figure 30B:
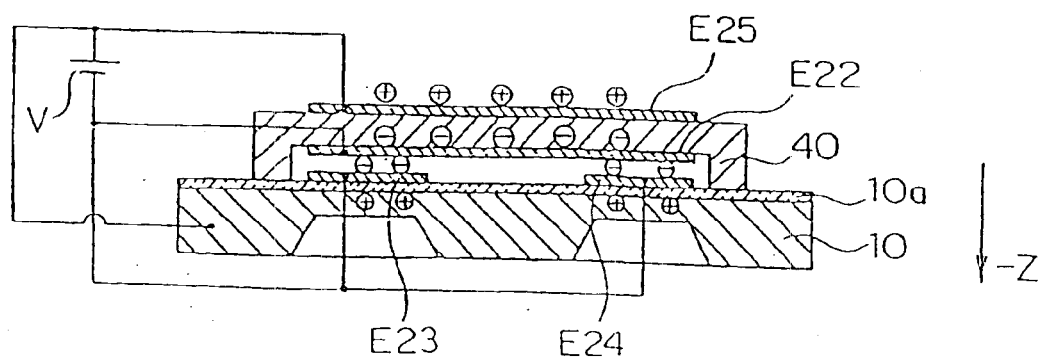
FIG. 30b is a model view showing a method of applying a voltage in order to realize the same state as the state where a force in a −Z direction is exerted on the weight body of the sensor shown in FIG. 1.

On the other hand, FIG. 30b is a model view showing a method of applying a voltage for realizing the same state as the state where a force in the −Z direction is exerted on the weight body. Electrode E22 on the control member 40 and electrodes E23 and E24 on the semiconductor pellet 10 are caused to produce charges of the same polarity by means of power supply V, thus allowing a repulsive force to be exerted therebetween. In this embodiment, with a view to carrying out a more efficient voltage application, there is an arrangement in which a different electrode E25 is formed on the upper surface of the control member 40, thus to give positive charges to the electrode E25. Namely, by allowing the control member 40 to be in the state of polarization on the opposite surfaces thereof, the electrode E22 is caused to produce negative charges. Further, positive charges are given to the body of the semiconductor pellet 10. Since an insulating layer 10a (generally, $SiO_2$ film or SiN film) is formed as shown on the upper surface of the semiconductor pellet 10, the insulating layer 10a is allowed to be in the state of polarization on the opposite surfaces thereof, thereby causing electrodes E23 and E24 to produce negative charges.

3.5 Advantages with this Testing Method (1) Since a coulomb force is exerted between a first portion and a second portion opposite thereto to allow the strain generative body to induce a mechanical deformation, thus to create the same state as the state where an external force is exerted on the working body, it is possible to conduct a test for a sensor without actually exerting an external force.

(2) Since a voltage of a predetermine polarity is applied across opposite two electrode layers to thereby exert a coulomb force therebetween, a test having a higher degree of freedom can be conducted.

(3) If one electrode layer is caused to be formed as a single electrode layer and the other electrode layer is caused to be formed as a plurality of subelectrode layers, selection of polarities of applied voltages is made, thereby making it possible to conduct a test in which a coulomb force is exerted in various directions.

(4) Since electrode layers for carrying out the above described test are formed within the acceleration sensor to implement wiring thereto, a test can be carried out simply by connecting a predetermined electric circuit to the acceleration sensor.

(5) Since electrode layers for carrying out the above: described test are formed within the magnetic sensor to implement wiring thereto, a test can be carried out simply by connecting a predetermined electric circuit to the magnetic sensor.

(6) Since, in the above described acceleration or magnetic sensor, one electrode layer is constituted with a single electrode layer and the other electrode layer is constituted with a plurality of subelectrode layers, selection of polarities of applied voltages is made, thereby making it possible to conduct a test in which a coulomb force is exerted in various directions (7) Since two subelectrodes are provided in the above described acceleration or magnetic sensor, a test in which a coulomb force is exerted with respect to two directions perpendicular to each other can be carried out.

(8) Since four subelectrode layers are provided in a crossing form in the above described acceleration or magnetic sensor, a test in which a coulomb force is exerted with respect to three directions perpendicular to each other can be carried out.

§4 Sensor Suitable for High Sensitivity Measurement 4.1 Structure of the Sensor

Figure 31:
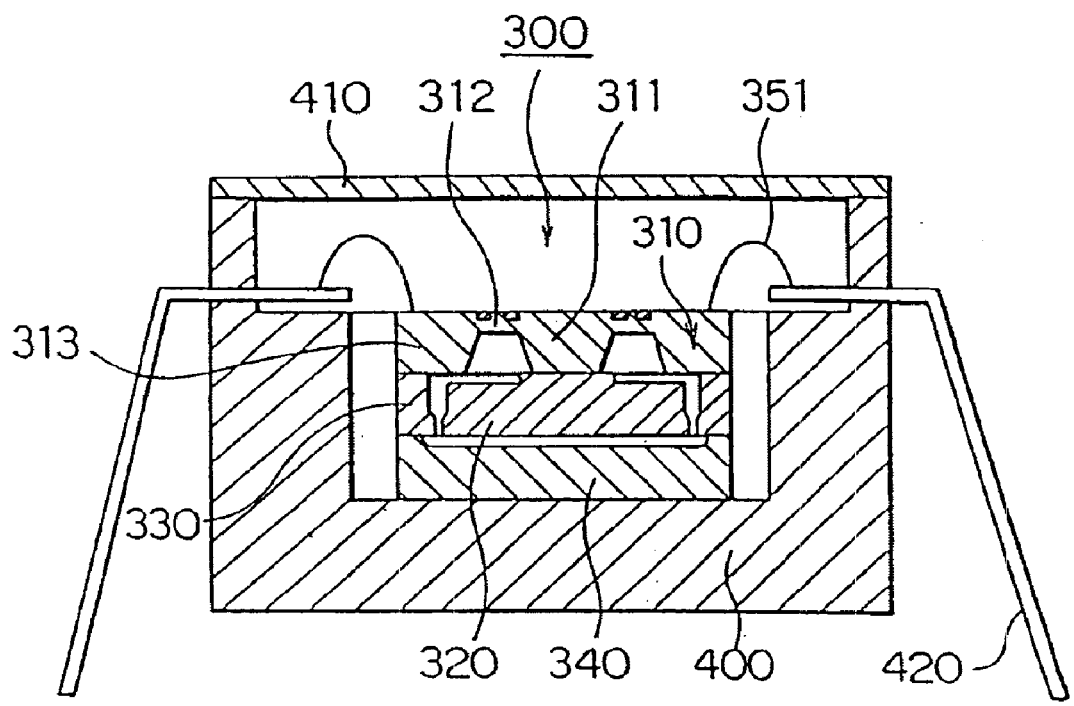
FIG. 31 is a cross sectional view of the structure of an acceleration sensor according to an embodiment of this invention.
Figure 32:
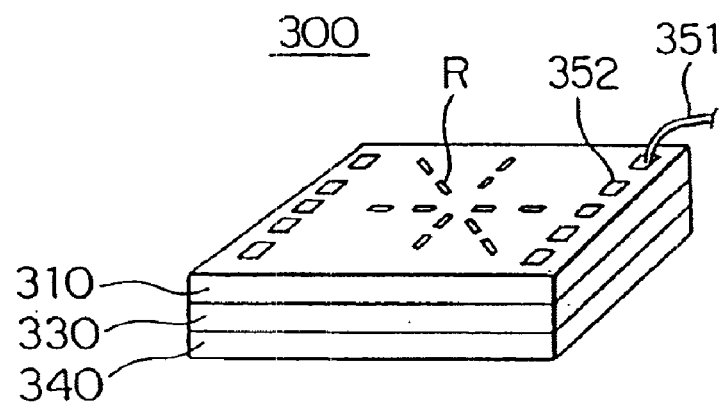
FIG. 32 is a perspective view of the center portion of the sensor shown in FIG. 31.

FIG. 31 is a structural cross sectional view of an acceleration sensor suitable for high sensitivity measurement according to an embodiment of this invention. The sensor center section 300 is composed of four elements of a semiconductor pellet 310, a weight body 320, a pedestal 330, and a control substrate 340. This sensor center section is connected to the bottom surface inside a package 400. A cover 410 is fitted over the upper part of the package 400. Further, leads 420 are drawn out from the side portions of the package 400 to the external. FIG. 32 is a perspective view of the sensor center section. A plurality of resistance elements R are formed on the upper surface of the semiconductor pellet 310, and respective resistance elements R are electrically connected to bonding pads 352. Bonding pads 352 and leads 420 are connected by means of bonding wires 351.

FIG. 33 is a detailed cross sectional view of the sensor center section of the acceleration sensor shown in FIG. 31. In this embodiment, the semiconductor pellet 310 is comprised of a single crystal silicon substrate, and resistance elements R are formed by diffusing impurity into the portion on the side of the upper surface of the semiconductor pellet 310. Of course, ion implantation process may be used, or there may be employed SOI structure in which gauge resistors are stacked on a silicon substrate. The resistance elements formed in this way have the piezo resistive effect. Namely, such elements have the property in which the electric resistance varies on the basis of a mechanical deformation. On the side of the lower surface of the semiconductor pellet 310, annular groove portions C1 are formed. In this embodiment, the groove portion C1 employs a taper structure such that the width become narrow according as the distance up to the bottom becomes small. However, a groove having the same width up to the bottom may be employed. FIG. 34 is a top view of the semiconductor pellet 310. The groove portion C1 dug on the lower surface is indicated by broken lines. Assuming now that coordinate axes X, Y and Z as indicated by arrow are defined, the cross section along the X-axis of the semiconductor pellet shown in FIG. 34 is shown in FIG. 33. By the formation of this groove portion C1, the semiconductor pellet 310 can be divided into three portions. Namely, there are three portions of a working portion 311 positioned inside the groove portion C1, a flexible portion 312 positioned just above the groove portion C1, and a fixed portion 313 positioned outside the groove portion C1. In other words, the working portion 311 is positioned at the central portion of the semiconductor pellet 310, the flexible portion 312 is positioned around the working portion 311, and the fixed portion 313 is positioned around the flexible portion 312. The flexible portion 312 has a thickness thinner than those of other portions by the presence of the groove portion C1. For this reason, the flexible portion 312 has flexibility In place of forming such an groove, through holes may be partially formed through the substrate to allow it to have flexibility.

Figure 35:
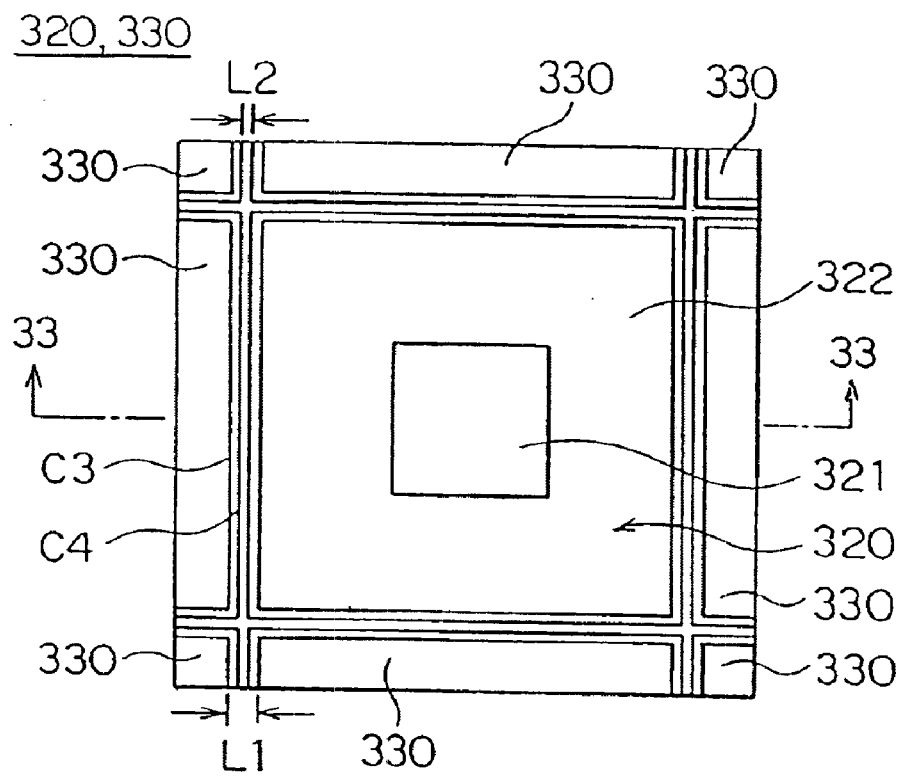
FIG. 35 is a top view of the weight body 320 and the pedestal 330 shown in FIG. 33.

A weight body 320 is connected to the lower surface of the working portion 311, and a pedestal 330 is connected to the lower surface of the fixed portion 313. FIG. 35 is a top view of the weight body 310 and the pedestal 330. The cross section along the cutting plane line 33—33 of FIG. 35 is shown in FIG. 33. There is a difference in level on the upper surface of the weight body 320. That is, a weight body upper surface central portion 321 and a weight body upper surface peripheral portion 322 are formed. The weight body upper surface central portion 321 is a portion slightly raised at the central portion of the upper surface of the weight body 320. This portion is connected to the lower portion of the working portion 311. Accordingly, a gap portion C2 is formed between the weight body upper surface peripheral portion 322 and the lower surface of the semiconductor pellet 310. The pedestal 330 is comprised of eight members arranged in eight directions around the weight body 320. Between the weight body 320 and the pedestal 330, a groove portion C3 and a groove portion C4 are formed. As described later, the weight body 320 and the pedestal 330 are members originally comprised of the same substrate. These members are separated by cutting through the groove portions C3 and C4. As shown in FIG. 35, the groove portion C3 has a width L1, and the groove portion C4 has a width L2 narrower than the groove portion C3. As is clear from FIG. 33, the groove portions C3 and C4 are formed at the upper and lower parts, respectively. Of course, L1 may be equal to L2 from the requirement of machining.

Figure 36:
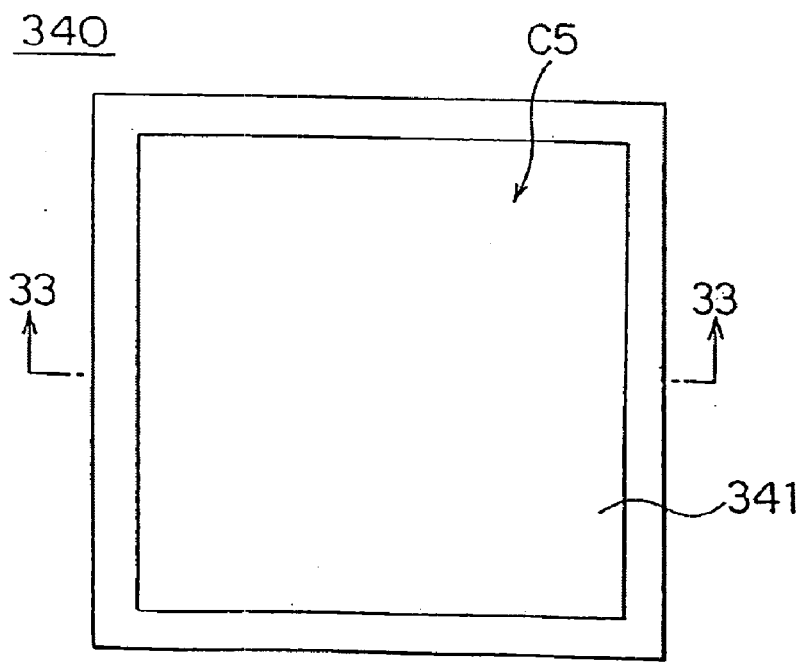
FIG. 36 is a top view of the control substrate 340 shown in FIG. 33, FIGS. 37 and 38 are a side cross sectional view and a top view of the auxiliary substrate 350 from which the weight body 320 and the pedestal 330 shown in FIG. 35 are basically formed.

The control substrate 340 is connected to the lower surface of the pedestal 330. The top view of the control substrate 340 is shown in FIG. 36. A groove portion C5 is dug in the control substrate 340 leaving the peripheral portion thereof. The bottom surface of the groove portion C5 forms a control surface 341. The cross section along the cutting plane line 33—33 of FIG. 36 is shown in FIG. 33. As shown in FIG. 33, only the peripheral portion of the control substrate is connected to the lower surface of the pedestal 330.

4.2 Method of Manufacturing the Sensor

Figure 37:
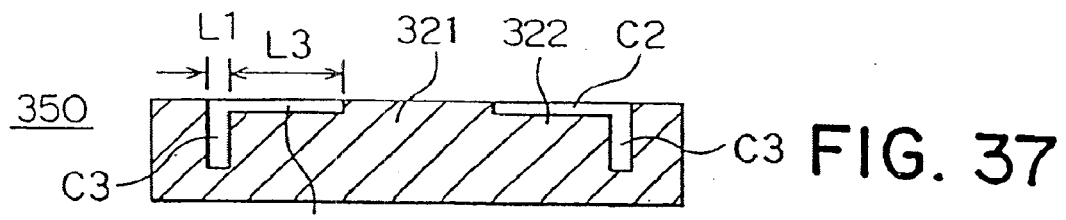
Figure 38:
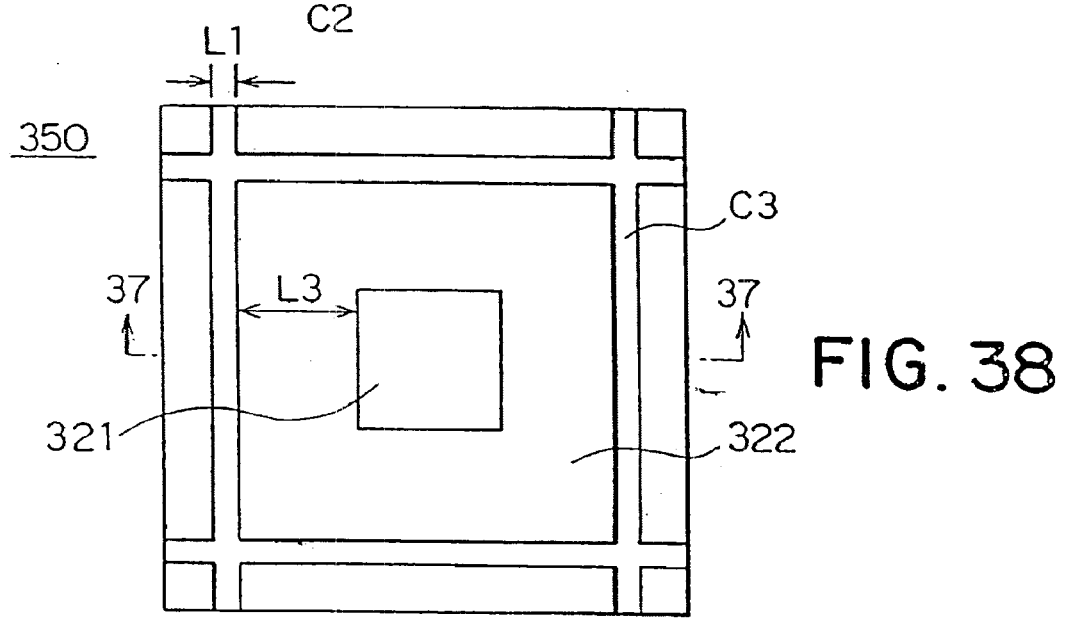

For helping understanding of the structure of the sensor center section 300, the manufacturing method thereof will be briefly described. Initially, a semiconductor pellet 310 as shown in FIG. 34 is prepared. Here, the groove portion C1 may be formed by, e.g., etching process, and resistance elements R may be formed by an impurity injection process using a predetermined mask. An auxiliary substrate 350 of which cross sectional view and top view are respectively shown in FIGS. 37 and 38 is prepared. Here, the cross section along the cutting plane line 37—37 of FIG. 38 corresponds to FIG. 37. As the material of the auxiliary substrate 350, it is preferable to use silicon which is the same Material as that of the semiconductor pellet 310, or glass. This is because since the semiconductor pellet 310 and the auxiliary substrate 350 are connected later, the both coefficients of thermal expansion are caused to be equal to each other to thereby suppress occurrence of cracks, thus to improve the temperature characteristic. On the side of the upper surface of the auxiliary substrate 350, a groove portion C3 in the form of parallel crosses is dug. Inside the groove portion C3, a gap portion C2 having a width L3 is formed. As a result, there occurs a difference in level between the weight body upper surface central portion 321 and the weight body upper surface peripheral portion 322. The gap portion C2 may be formed by, e.g., etching process, and the groove portion C3 may be formed by the cutting process using a dicing blade. It should be noted that the groove portion C4 shown in FIG. 33 or 35 is not yet formed. Accordingly, the auxiliary substrate 350 is in the state of a single substrate. The lower surface of the auxiliary substrate 350 prepared in this way is connected to the lower surface of the semiconductor pellet 310. At this time, the weight body upper surface central portion 321 is connected to the lower surface of the working portion 311, and the portion around the auxiliary substrate 350 (the portion which will constitute the pedestal 330 later) is connected to the fixed portion 313 lower surface. After such a connection is completed, the lower surface of the auxiliary substrate 350 is subjected to cutting process by means of a dicing blade having a width L2, thus to form a groove portion C4. The groove portion C3 and the groove portion C4 communicate with each other, and the auxiliary substrate 350 is divided into the weight body 320 at the central portion and the pedestal 330 at the peripheral portion. Thereafter, a control substrate 340 as shown in FIG. 36 is prepared to form a groove portion C5 by the etching process, etc. The control substrate 340 thus processed is connected to the lower surface of the pedestal 330. After undergoing the above-described manufacturing process steps, sensor center portion 300 shown in FIG. 33 is provided.

It is to be noted that the above-described process is directed to a method of manufacturing a single unit, but actually manufacturing is conducted every wafer in the state where a plurality of such units are longitudinally and breadthly arranged. Namely, a wafer on which units shown in FIG. 34 are longitudinally and breadthly arranged and an auxiliary substrate on which units shown in FIG. 35 are longitudinally and breadthly arranged are connected. To this assembly, an auxiliary substrate on which units shown in FIG. 36 are longitudinally and breadthly arranged is further connected. Thereafter, the assembly thus obtained is finally cut every respective units. It is to be noted that while the gap portion C2 is formed on the auxiliary substrate 350 side in this example, the fixed portion of the semiconductor pellet 310 may be etched to provide the gap portion C2 on the semiconductor pellet 310 side.

4.3 Operation of the Sensor

The operation of this sensor will now be described. As shown in FIG. 31, the sensor center portion 300 is fixed to the bottom surface at the inside of the package 400. Since the control substrate 340, the pedestal 330 and the fixed portion 313 are in the state where they are fixed to each other, the fixed portion 313 is indirectly fixed to the package 400. On the other hand, the weight body 320 is in a hanging state within a space peripherally encompassed by the pedestal 330. Namely, as shown in FIG. 33, the groove portion C5 is formed on the side of the lower surface of the weight body 320, the groove portions C3 and C4 are formed on the side of the side surface thereof, and the gap portion C2 is formed on the side of the peripheral portion of the upper surface thereof. Further, only the central portion of the upper surface of the weight body 320 is connected to the working portion 311. When an acceleration is exerted on the weight body 320 placed in such a hanging state, a force is exerted on the working portion 311 by this acceleration. As previously described, since the flexible portion 312 is the portion having flexibility, when a force is exerted on the working portion 311, the flexible portion 312 produces a bend. As a result, the working portion 311 produces a displacement relative to the fixed portion 313 The bend of the flexible portion 312 causes mechanical deformations in the resistance elements R, so there occur changes in the electric resistance values of the resistance elements R. Since changes in the electric resistance values can be detected outside the sensor by making use of bonding wires 351 and leads 420 as shown in FIG. 32. In the case of the sensor of this embodiment, by arranging resistance elements R at positions as shown in FIG. 34, it is possible to independently detect acceleration components in respective axial directions of X, Y and Z. The principle of detection has been already described in §1.

4.4 Feature of the Sensor

Figure 39:
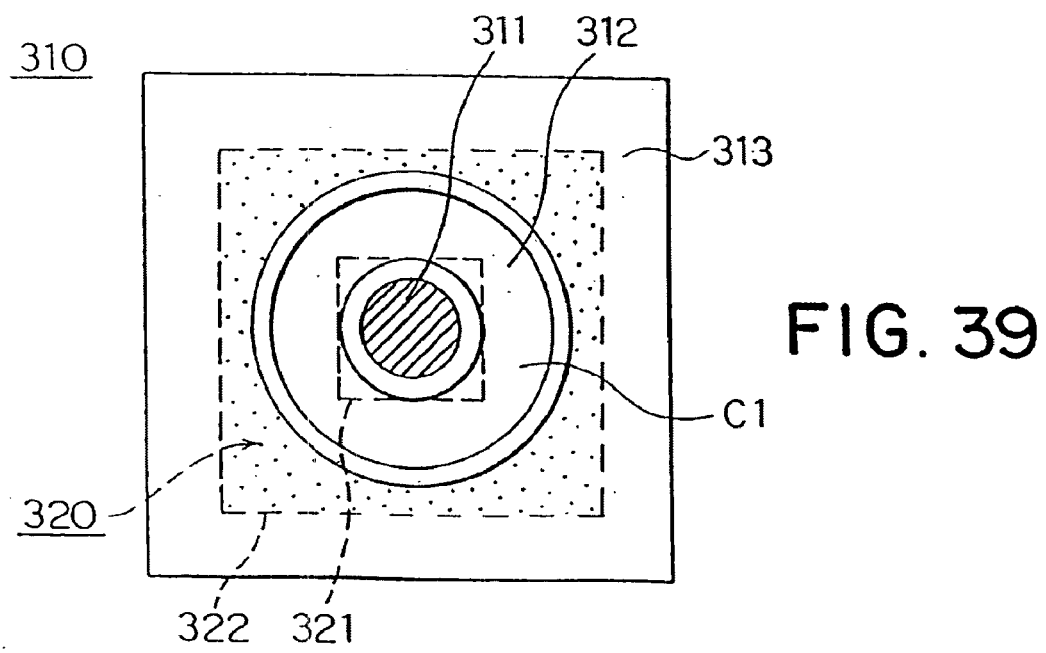
FIG. 39 is a view showing the position where the weight body 320 is connected to the semiconductor pellet 310 shown in FIG. 33, FIGS. 40 and 41 are a side cross sectional view and a top view showing an auxiliary substrate according to a different embodiment of this invention, respectively.

The feature of the acceleration sensor which as been described above is that it is suitable for high sensitivity acceleration measurement. The first reason is that the volume of the weight body 320 can be as large as possible within a limited spade. As shown in FIG. 33, the weight body 320 is connected only at the weight body upper surface central portion 321 to the working portion 311, but the peripheral thereof is laterally widened to extend up to the inside portion of the fixed portion 313 striding over the groove portion C1. For this reason, the mass of the weight body can be increased. As a result, even if a small acceleration is applied, this sensor can transmit a sufficient force to the working portion 311. The second reason is that the control member for allowing a displacement of the weight body to limitatively fall within a predetermined range can be constituted with a simple structure. In the structure shown in FIG. 33, a displacement in an upper direction of the weight body 320, a displacement in a lateral direction thereof, and a displacement in a lower direction thereof are caused to all limitatively fall within a predetermined ranges, respectively. First, with respect to a displacement in an upper direction, it can be understood that a portion of the lower surface of the fixed portion 313 functions as a control member. In FIG. 33, when the weight body 320 attempts to move in an upper direction, the working portion 311 moves in an upper direction by bend of the flexible portion 312. Following this, the weight body upper surface central portion 321 also moves in an upper direction. However, the outer circumferential, portion of the weight body upper surface peripheral portion 322 comes into contact with the lower surface of the fixed portion 313, so movement thereof is prevented. In other words, a displacement in an upper direction of the weight body 320 is allowed to limitatively fall within a range of the size of the gap portion C2. This limiting action is made more clear when reference is made to FIG. 39. FIG. 39 is the bottom view of the semiconductor pellet 310 wherein the position of the weight body 320 is indicated by broken lines. The weight body 320 is connected only to the hatched portion by slanting lines at the central portion (lower surface of the working portion 311). The portion outside the groove portion C1 serves as the fixed portion 313. The portion of the hatched portion by dots of the portion outside the groove portion C1 is a surface performing the function as the control member. The weight body 320 comes into contact with this surface, so upward movement thereof is limited. On the other hand, with respect to movement in a lateral direction, as is clear from FIG. 33, the side surface of the weight body 320 comes into contact with the inside surface of the pedestal 330. Thus, displacement is allowed to: limitatively fall within a range of the size of the groove portion C4. Further, with respect to a displacement in a lower direction, the lower surface of the weight body 320 comes into contact with the control surface 341 of the control substrate 340. Thus, displacement is allowed to limitatively fall within a range of the size of the groove portion C5. Since displacement of the weight body 320 is allowed to limitatively fall within a predetermined range with respect to movement in all directions, the risk that the semiconductor pellet 310 may be broken, by an excessive displacement can be avoided. Such a control of displacement is particularly important in the case of a high sensitivity sensor. In accordance with the structure of this invention, since an approach is employed to control a displacement in an upper direction by making use of the semiconductor pellet 310, and to control a displacement in a lateral direction by making use of the pedestal 330, there is no necessity of individually providing control members, respectively. As a result, the structure becomes very simple. Accordingly, mass production can be advantageously carried out.

4.5 Other Embodiments

While this invention has been described in connection with the embodiment shown, this invention is not limited only to this embodiment, but can be carried out in various forms. Several other embodiments are shown below.

Figure 40:
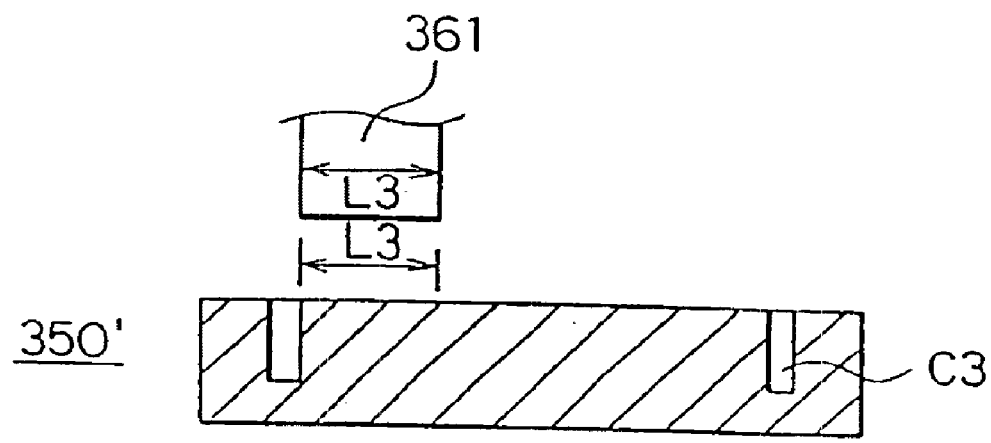
Figure 41:
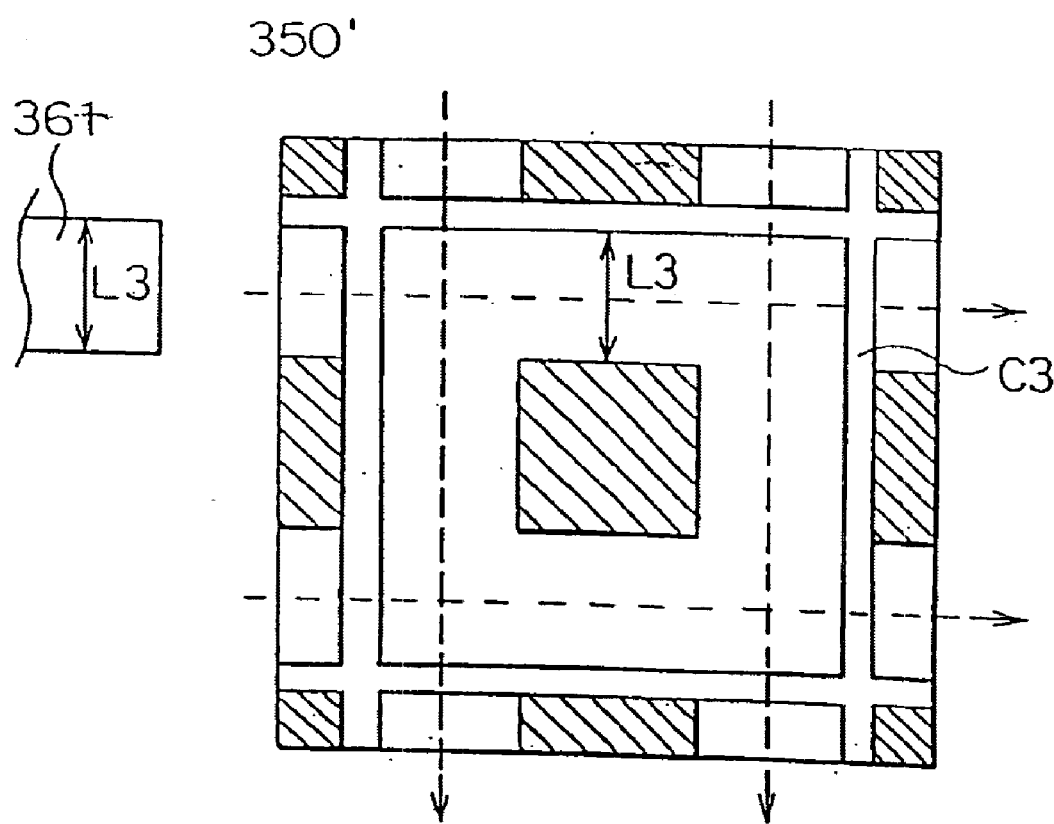

As the method of forming the auxiliary substrate 350 shown in FIGS. 37 and 38, the method of forming the groove portion C3 by cutting process using a dicing blade, and forming the groove portion C2 by etching process is shown as an example in the previously described embodiment. In addition, the gap portion C2 may be formed by cutting process using a dicing blade. This is accomplished by preparing a dicing blade 361 having a width L3, as shown in FIG. 40, for example, to carry out cutting process so as to allow it to pass through a route indicated by broken lines in FIG. 41 to form an auxiliary substrate 350'. Of course, an approach may be employed to allow a dicing blade having a less than the width L3 to pass several times to dig a groove having the width L3. In FIG. 41, only the hatched area is the portion which does not undergo cutting process. When such a cutting process is carried out, the portion serving as the pedestal 330 is partially cut. However, any trouble does not occur with respect to the function as the pedestal 330. Generally, in the case of mass producing auxiliary substrates, auxiliary substrate 350' as shown in FIG. 41 is assumed as a unit to arrange a large of auxiliary substrates longitudinally and breadthly on a wafer to carry out process of the substrates every wafer thereafter to cut respective units by the dicing process. For such a process every wafer, the above described cutting process is very efficient. When an approach is employed to linearly move the dicing blade 361 on a wafer, cutting process for a large number of auxiliary substrates can be carried out at a time.

Figure 42:
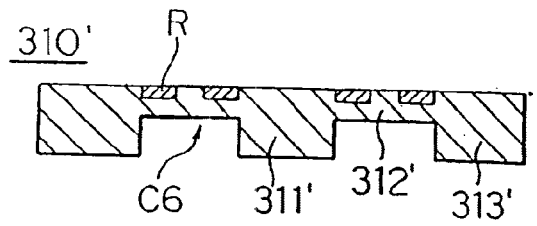
FIGS. 42 and 43 are a side cross sectional view and a bottom view showing a semiconductor pellet according to a further different embodiment of this invention, respectively.
Figure 43:
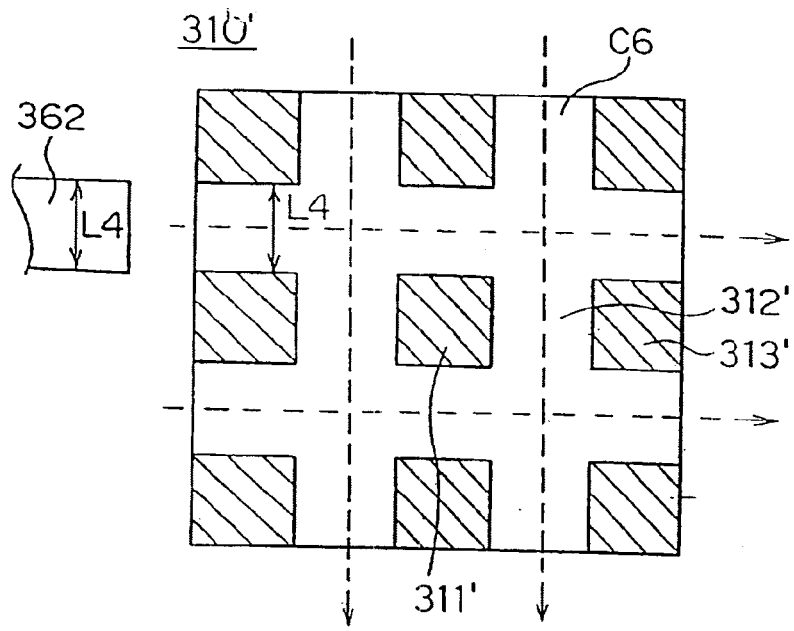
Figure 44:
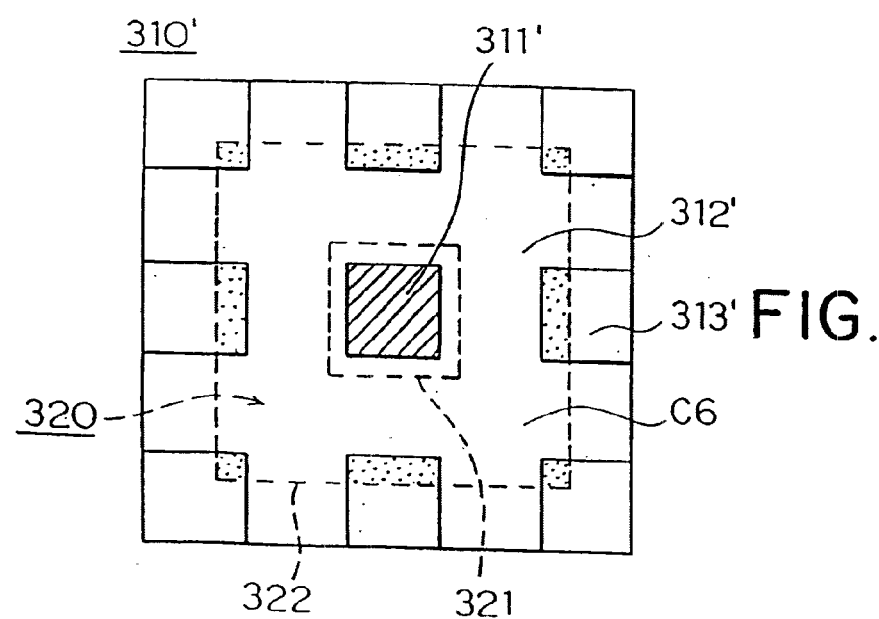
FIG. 44 is a view showing the position where the weight body 310 is connected to the semiconductor pellet 310' shown in FIG. 43.

In the previously described embodiment, the groove portion C1 dug in the semiconductor pellet 310 was annular as shown in FIG. 34. Such an annular groove can be easily formed by the etching process. However, if an attempt is made to form such an annular groove by the cutting process using a dicing blade, the movement control of the dicing blade becomes complicated. This is not suitable. In this invention, the groove portion formed in the semiconductor pellet 310 is not limited to the annular groove portion. Here, the cross sectional view of the embodiment where the groove portion in the form of parallel crosses is formed on the side of the lower surface of the semiconductor pellet 310' is shown in FIG. 42, and the bottom view thereof is shown in FIG. 43. Such a groove may be provided by preparing a dicing blade 362 having a width L4 as shown in FIG. 43 to allow it to pass through a route indicated by broken lines to carry out cutting process. Of course, an approach may be employed to allow a dicing blade having a less than the width L4 to pass several times to dig a groove having a width L4. Only the hatched area in FIG. 43 is the portion which does not undergo cutting process. When such a cutting process is carried out, the shapes of the working portion 311', the flexible portion 312' and the fixed portion 313' are different to some extent from those of the previously described embodiment, but there does not occur any inconvenience with respect to the functions of respective portions. FIG. 44 is a bottom view of this semiconductor pellet 310' wherein the position of the weight body 320 is indicated by broken lines. The weight body 320 is connected to only the hatched portion by slanting lines at the central portion (the lower surface of the working portion 311'). The portion outside the groove portion C6 serves as the fixed portion 313'. The hatched portion by dots of the portion outside the groove portion C6 serves as the surface performing the function as the control member. This embodiment is also suitable for a method processing every wafer.

Figure 45:
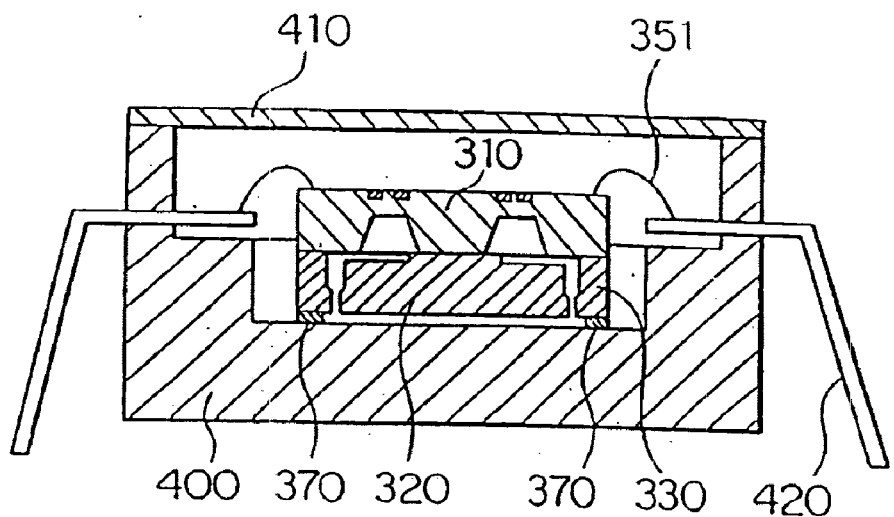
FIG. 45 is a side cross sectional view of the structure of an acceleration sensor according to a further different embodiment of this invention.

In the embodiment shown in FIG. 45, a spacer 370 is used in place of the control substrate 340 For this spacer 370, e.g., a film of glass fiber, etc. may be used. When the spacer 370 is put between the lower surface of the pedestal 330 and the bottom surface at the inside of the package 400, and is fixed therebetween by a method such as die bond, the bottom surface itself at the inside of the package 400 can be utilized as a member for controlling a displacement in a lower direction of the weight body 320. The allowed displacement in a lower direction of the weight body 320 is determined by the thickness of the spacer 370. In addition, in place of using the spacer 370, an approach may be employed to etch the lower surface of the weight body 320 (the surface against the bottom surface side of the package 400) to allow the weight body 320 to be in a floating state when the pedestal is connected to the package. Alternatively, an approach may be employed to dig a groove on the side of the bottom surface at the inside of the package 400 to allow the weight body 320 to be in a floating state.

Figure 46:
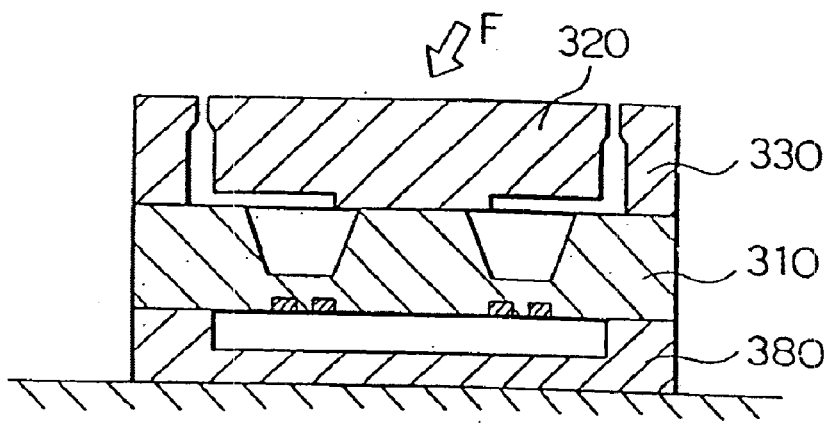
FIGS. 46 and 47 are cross sectional views of a force sensor according to an embodiment of this invention, respectively.
Figure 47:
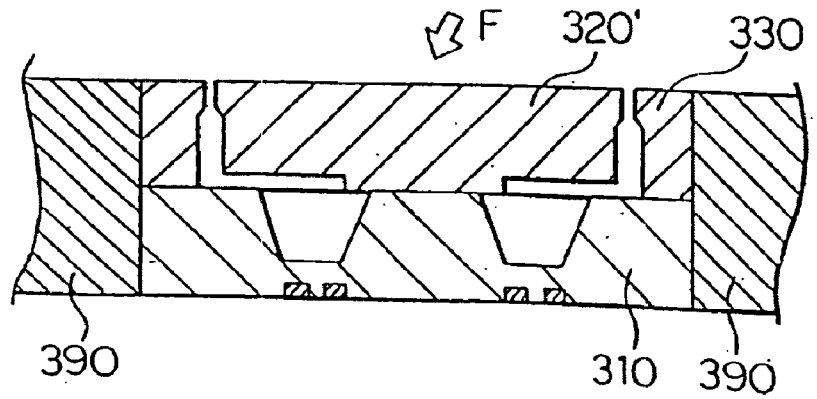

While this invention is applied to the acceleration sensor in the above described all embodiments, if the previously described weight body 320 is replaced by a general working body, this invention is applicable to a magnetic sensor or a force sensor. For example, in the case where this invention is applied to the magnetic sensor, any working body responsive to magnetism (magnetic body suits for this purpose) may be used instead of the weight body 320. Further, in the case where this sensor is applied to a force sensor, if an approach is employed to support the semiconductor pellet 310 by the supporting member 380, as shown in FIG. 46, for example, an external force F exerted as shown on the working body 320' can be detected. Alternatively, if an approach is employed to support the semiconductor pellet 310 and the pedestal 330 by the supporting member 390 as shown in FIG. 47, the same effect as the above will be provided.

4.6 Examples of Utilization of the Acceleration Sensor

Figure 48:
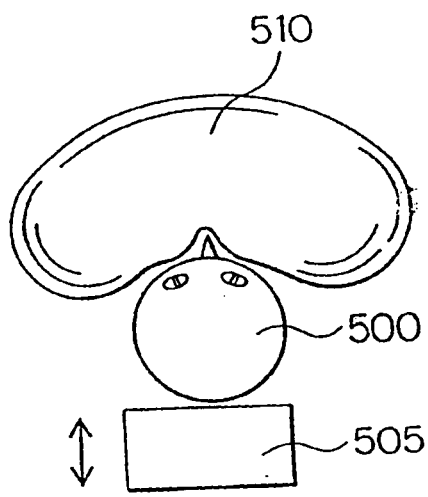
FIG. 48 is an explanatory view of a conventional air bag system
Figure 49:
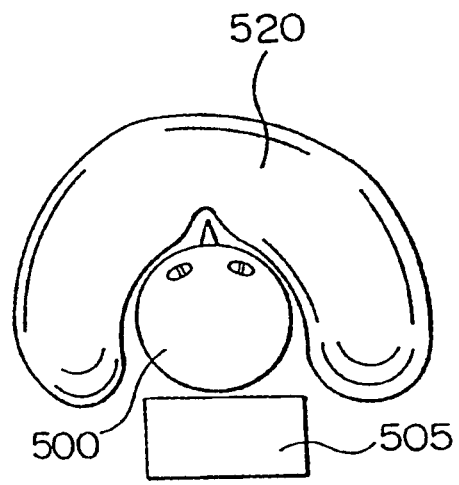
FIG. 49 is an explanatory view of an air bag system utilizing an acceleration sensor according to this invention.

As described above, if this invention is applied to the acceleration sensor, it is possible to detect, with high sensitivity, an acceleration in three dimensional directions. Such a high sensitivity acceleration sensor can be utilized in various fields. For example, as the system for protecting a passenger from an automotive vehicle accident, air bags beings becoming popular. However, since only acceleration sensors in one dimensional direction is put into practice for the time being, the present air bags are the system in which the front collision is assumed. Namely, as shown in FIG. 48, when an impact in a direction indicated by an arrow is detected, an air bag 510 is caused to be swollen in front of a passenger 500 to protect the passenger 500 in a manner to put the passenger between a seat 505 and the air bag 510. Accordingly, an air bag in a spherical form is used as the air bag 510. On the contrary, since a sensor according to this invention can detect, with high sensitivity, an acceleration in a three-dimensional direction, even in the case where a side collision takes place, this sensor can detect an impact. Accordingly, as shown in FIG. 49, if an air bag 520 in a form to cover the side parts of the passenger 500 is prepared to swell this air bag in response to a detection signal from the acceleration sensor according to this invention, an air bag system capable of coping with a side collision can be introduced.

4.7 Detection Sensitivity in Respective Axial Directions of Three Dimensions

Figure 50:
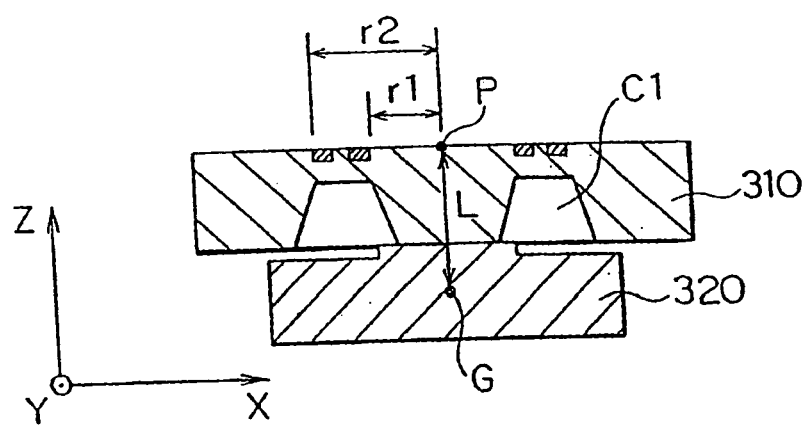
FIG. 50 is a view showing the principle of the design of dimension according to this invention.

The sensor of this invention can detect force, acceleration and magnetism in three dimensional directions. However, if there is a great difference between detection sensitivities of these physical quantities with respect to respective axial directions, this is a problem. Now let suppose a simple model of an acceleration sensor as shown in FIG. 50. This acceleration sensor detects an acceleration applied to the weight body 320 as a force (or moment) exerted on the point P on the upper surface of the semiconductor pellet 310 (the foot of the perpendicular from the center of gravity G of the weight body 320 onto the upper surface of the semiconductor pellet 320). Here, let define an X-axis, a Y-axis (direction perpendicular to the plane surface of paper), and a Z axis in directions indicated by arrows in FIG. 50, and assume an acceleration exerted on the weight body 320 of the mass m as an acceleration exerted on the center of gravity G. Thus, an acceleration in a Z-axis direction exerted on the center of gravity G is detected as a force $Fz$ (=$m \cdot \alpha z$) exerted in a Z-axis direction at the point P. On the contrary, an acceleration $\alpha x$ in an X-axis direction exerted on the center of gravity G is detected as a moment $My$ (=$m \cdot \alpha x \cdot L$) about the Y-axis at the point P, and an acceleration $\alpha y$ in a Y-axis direction exerted on the center of gravity G is detected as a moment $Mx$ (=$m \cdot \alpha y \cdot L$) about the X-axis at the point P. Accordingly, if the semiconductor pellet 310 is of a structure symmetric in plane, a detection sensitivity of an acceleration exerted in an X-axis direction and a detection sensitivity of an acceleration exerted in a Y-axis direction can be nearly equal to each other. However, these detection sensitivities and the detection sensitivity of an acceleration exerted in a Z-axis direction are generally different.

The inventor of this application has drawn attention to the fact that moments Mx and My are quantities having the length L of the perpendicular as a parameter. The inventor notices that the detection sensitivities in three axial directions of X, Y and Z can be substantially equal to each other by determining L as a suitable value. As the result of the experiment, if L satisfies the following condition, the inventor has found out that detection sensitivities in three axial directions are substantially equal to each other. Namely, as shown in FIG. 50, when the distance from the point P up to the inside portion of the groove depth portion dug in the semiconductor pellet 310 is assumed as r1, and the distance from the point P up to the outside portion of the groove depth portion is assumed as r2, if setting is made such that the relationship expressed as r1<L<r2 holds, detection sensitivities in three axial directions are substantially equal to each other. It is to be noted that the sensitivities of respective axes of X, Y and Z under changes to some extent in dependency upon the form of the flexible portion or the working portion, etc. as well. For this reason, there are instances where the relationship expressed as r1<L is not completely satisfied. As long as at least the relationship expressed as L<r2 is maintained, the effect to equalize the detection sensitivities is exhibited. Accordingly, in the case of actually manufacturing the sensor according to this invention, it is preferable to design dimensions of respective portions in consideration of such a condition.

4.8 Method of Testing Sensor

Figure 51:
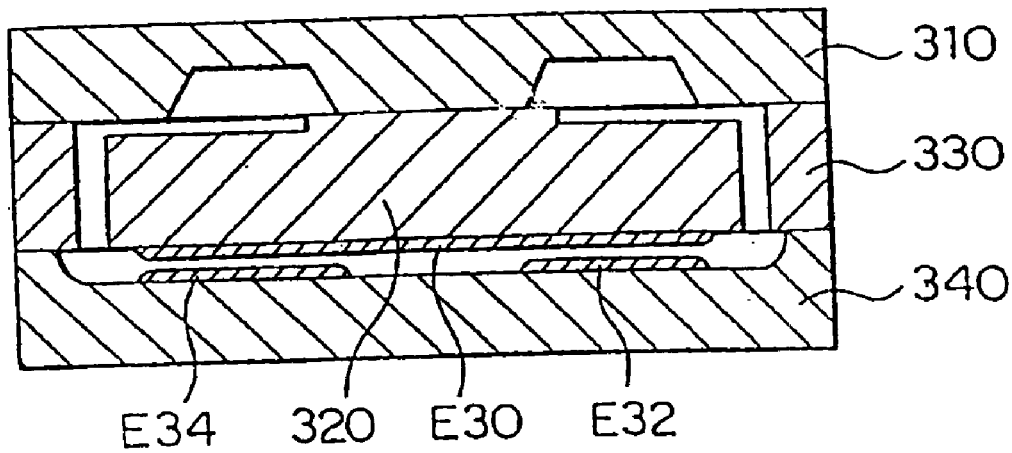
FIG. 51 is a side cross sectional view showing the structure when a testing method peculiar a sensor according to this invention is applied.
Figure 52:
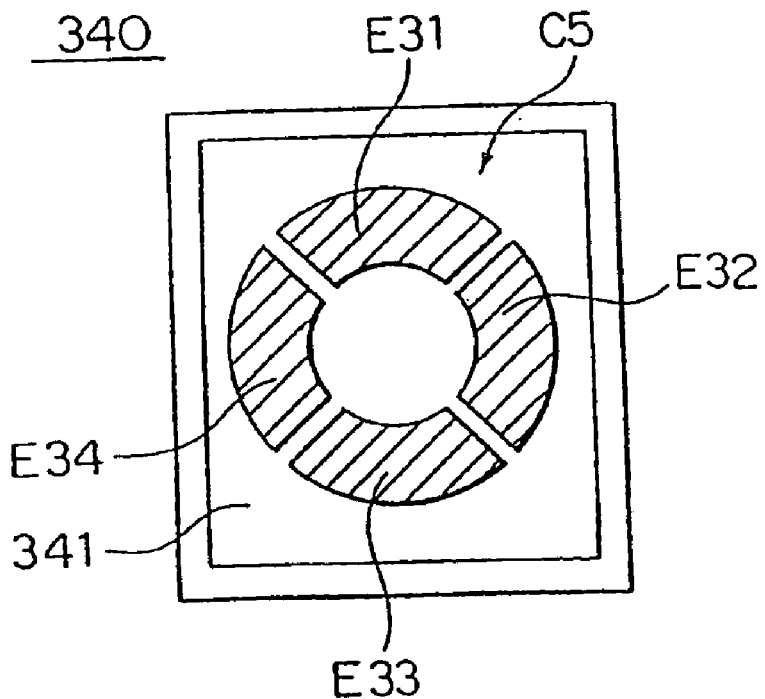
FIG. 52 is a top view of the control substrate 340 shown in FIG. 51.

In the case of mass producing sensors according to this invention, there occurs the necessity of testing respective sensors prior to shipping or forwarding. The method for easily carrying out such a test has been described in §3. FIG. 51 is a side cross sectional view showing the structure when this testing method is applied to the sensor center section 300 shown in FIG. 33, and FIG. 52 is a top view of the control substrate 340 at this time (the hatched portion indicates the electrode). A single electrode plate E30 is formed on the bottom surface of the weight body 320 and four electrode plates E31 to E34 are formed so as to face the electrode plate E30 on the control surface 341 of the control substrate 340. Wiring layers are connected to the electrode plates, respectively, but an indication thereof is omitted here. If an approach is employed to form such electrode layers to apply voltages of predetermined polarities to respective electrode layers, a coulomb force is exerted between Opposite electrode layers, thus making it possible to exert a force on the weight body 320 although no acceleration is exerted. By varying polarities of voltages applied to respective electrode layers, it is possible to apply a force in various directions. By comparing voltages applied to respective electrode layers and a primary sensor output, the test as to whether or not this sensor normally operates can be conducted.

4.9 Advantages with this Sensor (1) In accordance with the above described sensor, since there is employed an arrangement such that the side portions of the working body extend up to the portion below the fixed portion of the substrate, it is possible to make a design so that the volume of the working body is enlarged as a whole. As a result, the weight of the working body is increased, thus making it possible to easily improve the sensitivity. Further, since there is employed an arrangement to utilize the lower surface of the fixed portion of the substrate as the control member, thus to limit a displacement in an upper direction of the working body, a sensor suitable for high sensitivity physical quantity measurement can be realized with a simple structure.

(2) If there is employed in the above described sensor an arrangement to utilize the inside surface of the pedestal as the control member, thus to limit a displacement in a lateral direction of the working body, a sensor suitable for high sensitivity physical quantity measurement can be realized with a simple structure.

(3) If there is employed in the above described sensor an arrangement to fix the pedestal so that the lower surface of the working body and a predetermined control surface are opposite with a predetermined spacing therebetween, thus permitting a displacement in a lower direction of the working body to limitatively fall within a predetermined range by this control surface, a sensor suitable for high sensitivity physical quantity measurement can be realized with a simple structure.

(4) If there is employed in the above described sensor an arrangement to make a design so that the distance between the working point defined at the central portion of the upper surface of the substrate falls within an optimum range, detection sensitivities in respective axial directions of three dimensions can be uniform.

INDUSTRIAL APPLICABILITY

A force sensor, an acceleration sensor, and a magnetic sensor according to this invention can be mounted and utilized in all industrial machines. Since high precision measurement can be conducted with a small and low cost sensor, application of an automotive vehicle or an industrial robot is expected. Particularly, the acceleration sensor serves, as described as the embodiment, as an ideal device for use in which this sensor is mounted in an automotive vehicle to produce an operating signal to an air bag.

What is claimed is:

1. A method of testing an acceleration sensor,
said acceleration sensor comprising:
  a substrate arranged along a XY-plane of an XYZ three-dimensional coordinate system;
  a working body receiving a force and located adjacent to said substrate with a predetermined distance;
  a flexible member made of silicon supporting said working body at a periphery thereof so that said working body is suspended and spatial deviation of said working body is produced by applying said force thereto;
  a fixing member fixing said flexible member to said substrate; and
  a transducer for transforming said spatial deviation into an electric signal that indicates a direction and a magnitude of said force,
said method comprising the steps of:
  providing a deviation electrode and a fixed electrode, said deviation electrode being located at a position which deviates along with said working body and said fixed electrode being fixed to said substrate so as to face said deviation electrode;
  applying a voltage between said deviation electrode and said fixed electrode so that Coulomb force is produced which causes spatial deviation of said working body in an X-axis direction of said XYZ three-dimensional coordinate system;
  detecting an electric signal transformed by said transducer while said spatial deviation is caused by applying said voltage; and
  testing an operation of said acceleration sensor with respect to said X-axis direction based on a relationship between said applied voltage and said detected electric signal.

2. A method of testing an acceleration sensor,
said acceleration sensor comprising:
  a substrate arranged along an XY-plane of an XYZ three-dimensional coordinate system;
  a working body receiving a force and located adjacent to said substrate with a predetermined distance;
  a flexible member made of silicon supporting said working body at a periphery thereof so that said working body is suspended and spatial deviation of said working body is produced by applying said force thereto;

a fixing member fixing said flexible member to said substrate; and a transducer for transforming said spatial deviation into an electric signal that indicates a direction and a magnitude of said force, said method comprising the steps of:

providing a deviation electrode and a fixed electrode, said deviation electrode being located at a position which deviates along with said working body and said fixed electrode being fixed to said substrate so as to face said deviation electrode;

applying a voltage between said deviation electrode and said fixed electrode so that Coulomb force is produced which causes spatial deviation of said working body in a Z-axis direction of said XYZ three-dimensional coordinate system;

detecting an electric signal transformed by said transducer while said spatial deviation is caused by applying said voltage; and testing an operation of said acceleration sensor with respect to said Z-axis direction based on a relationship between said applied voltage and said detected electric signal.

3. A method of testing an acceleration sensor, said acceleration sensor comprising:

a substrate arranged along an XY-plane of an XYZ three-dimensional coordinate system;

a working body receiving a force and located adjacent to said substrate with a predetermined distance;

a flexible member made of silicon supporting said working body at a periphery thereof so that said working body is suspended and spatial deviation of said working body is produced by applying said force thereto;

a fixing member fixing said flexible member to said substrate; and a transducer for transforming said spatial deviation into an electric signal that indicates a direction and a magnitude of said force, said method comprising the steps of:

providing a deviation electrode and a fixed electrode, said deviation electrode being located at a position which deviates along with said working body and said fixed electrode being fixed to said substrate so as to face said deviation electrode;

applying a first voltage between said deviation electrode and said fixed electrode so that Coulomb force is produced which causes first spatial deviation of said working body in an X-axis direction of said XYZ three-dimensional coordinate system;

detecting a first electric signal transformed by said transducer while said first spatial deviation is caused by applying said first voltage;

testing a first operation of said acceleration sensor with respect to said X-axis direction based on a relationship between said applied first voltage and said detected first electric signal;

applying a second voltage between said deviation electrode and said fixed electrode so that Coulomb force is produced which causes second spatial deviation of said working body in a Z-axis direction of said XYZ three-dimensional coordinate system;

detecting a second electric signal transformed by said transducer while said second spatial deviation is caused by applying said second voltage; and testing a second operation of said acceleration sensor with respect to said Z-axis direction based on a relationship between said applied second voltage and said detected second electric signal.

4. A method of testing an acceleration sensor, said acceleration sensor comprising:

a substrate arranged along an XY-plane of an XYZ three-dimensional coordinate system;

a working body receiving a force and located adjacent to said substrate with a predetermined distance;

a flexible member made of silicon supporting said working body at a periphery thereof so that said working body is suspended and spatial deviation of said working body is produced by applying said force thereto;

a fixing member fixing said flexible member to said substrate; and a transducer for transforming said spatial deviation into an electric signal that indicates a direction and a magnitude of said force;

said method comprising the steps of:

providing a first deviation electrode and a first fixed electrode, said first deviation electrode being located at a position which deviates along with said working body and said first fixed electrode being fixed to said substrate so as to face said first deviation electrode;

providing a second deviation electrode and a second fixed electrode, said second deviation electrode being located at a position which deviates along with said working body and said second fixed electrode being fixed to said substrate so as to face said second deviation electrode;

applying a first voltage between said first deviation electrode and said first fixed electrode so that Coulomb force is produced which causes first spatial deviation of said working body in an X-axis direction of said XYZ three-dimensional coordinate system;

detecting a first electric signal transformed by said transducer while said first spatial deviation is caused by applying said first voltage;

testing a first operation of said acceleration sensor with respect to said X-axis direction based on a relationship between said applied first voltage and said detected first electric signal;

applying a second voltage between said second deviation electrode and said second fixed electrode so that Coulomb force is produced which causes second spatial deviation of said working body in a Y-axis direction of said XYZ three-dimensional coordinate system;

detecting a second electric signal transformed by said transducer while said second spatial deviation is caused by applying said second voltage; and testing a second operation of said acceleration sensor with respect to said Y-axis direction based on a relationship between said applied second voltage and said detected second electric signal.

5. A method of testing an acceleration sensor, said acceleration sensor comprising:

a substrate arranged along an XY-plane of an XYZ three-dimensional coordinate system;

a working body receiving a force and located adjacent to said substrate with a predetermined distance;

a flexible member made of silicon supporting said working body at a periphery thereof so that said working body is suspended and spatial deviation of said working body is produced by applying said force thereto;
a fixing member fixing said flexible member to said substrate; and
a transducer for transforming said spatial deviation into an electric signal that indicates a direction and a magnitude of said force;

said method comprising the steps of:
providing a first deviation electrode and a first fixed electrode, said first deviation electrode being located at a position which deviates along with said working body and said first fixed electrode being fixed to said substrate so as to face said first deviation electrode;
providing a second deviation electrode and a second fixed electrode, said second deviation electrode being located at a position which deviates along with said working body and said second fixed electrode being fixed to said substrate so as to face said second deviation electrode;
applying a first voltage between said first deviation electrode and said first fixed electrode so that Coulomb force is produced which causes first spatial deviation of said working body in an X-axis direction of said XYZ three-dimensional coordinate system;
detecting a first electric signal transformed by said transducer while said first spatial deviation is caused by applying said first voltage;
testing a first operation of said acceleration sensor with respect to said X-axis direction based on a relationship between said applied first voltage and said detected first electric signal;
applying a second voltage between said second deviation electrode and said second fixed electrode so that Coulomb force is produced which causes second spatial deviation of said working body in a Y-axis direction of said XYZ three-dimensional coordinate system;
detecting a second electric signal transformed by said transducer while said second spatial deviation is caused by applying said second voltage;
testing a second operation of said acceleration sensor with respect to said Y-axis direction based on a relationship between said applied second voltage and said detected second electric signal;
applying a third voltage between said first deviation electrode and said first fixed electrode so that Coulomb force is produced which causes third spatial deviation of said working body in a Z-axis direction of said XYZ three-dimensional coordinate system;
detecting a third electric signal transformed by said transducer while said third spatial deviation is caused by applying said third voltage; and
testing a third operation of said acceleration sensor with respect to said Z-axis direction based on a relationship between said applied third voltage and said detected third electric signal.

6. A method of testing an acceleration sensor,
said acceleration sensor comprising:
a substrate arranged along an XY-plane of an XYZ three-dimensional coordinate system;
a working body receiving a force and located adjacent to said substrate with a predetermined distance;
a flexible member made of silicon supporting said working body at a periphery thereof so that said working body is suspended and spatial deviation of said working body is produced by applying said force thereto;
a fixing member fixing said flexible member to said substrate; and
a transducer for transforming said spatial deviation into an electric signal that indicates a direction and a magnitude of said force;

said method comprising the steps of:
providing a first deviation electrode and a first fixed electrode, said first deviation electrode being located at a position which deviates along with said working body and said first fixed electrode being fixed to said substrate so as to face said first deviation electrode;
providing a second deviation electrode and a second fixed electrode, said second deviation electrode being located at a position which deviates along with said working body and said second fixed electrode being fixed to said substrate so as to face said second deviation electrode;
applying a first voltage between said first deviation electrode and said first fixed electrode so that Coulomb force is produced which causes first spatial deviation of said working body in an X-axis direction of said XYZ three-dimensional coordinate system;
detecting a first electric signal transformed by said transducer while said first spatial deviation is caused by applying said first voltage;
testing a first operation of said acceleration sensor with respect to said X-axis direction based on a relationship between said applied first voltage and said detected first electric signal;
applying a second voltage between said second deviation electrode and said second fixed electrode so that Coulomb force is produced which causes second spatial deviation of said working body in a Y-axis direction of said XYZ three-dimensional coordinate system;
detecting a second electric signal transformed by said transducer while said second spatial deviation is caused by applying said second voltage;
testing a second operation of said acceleration sensor with respect to said Y-axis direction based on a relationship between said applied second voltage and said detected second electric signal;
applying a third voltage between said first deviation electrode and said first fixed electrode and between said second deviation electrode and said second fixed electrode so that Coulomb force is produced which causes third spatial deviation of said working body in a Z-axis direction of said XYZ three-dimensional coordinate system;
detecting a third electric signal transformed by said transducer while said third spatial deviation is caused by applying said third voltage; and
testing a third operation of said acceleration sensor with respect to said Z-axis direction based on a relationship between said applied third voltage and said detected third electric signal.

* * * * *